(12) United States Patent
Schmidt

(10) Patent No.: US 7,477,748 B2
(45) Date of Patent: Jan. 13, 2009

(54) SESSION KEY DISTRIBUTION METHODS USING A HIERARCHY OF KEY SERVERS

(76) Inventor: Colin Martin Schmidt, 8960 Broadway Street, Chilliwack, British Columbia (CA) V2P 5W1

( * ) Notice: Subject to any disclaimer, the term of this patent is extended or adjusted under 35 U.S.C. 154(b) by 833 days.

(21) Appl. No.: 10/507,572

(22) PCT Filed: Feb. 28, 2003

(86) PCT No.: PCT/CA03/00275

§ 371 (c)(1), (2), (4) Date: Sep. 10, 2004

(87) PCT Pub. No.: WO03/079607

PCT Pub. Date: Sep. 25, 2003

(65) Prior Publication Data

US 2005/0125684 A1   Jun. 9, 2005

Related U.S. Application Data

(60) Provisional application No. 60/364,621, filed on Mar. 18, 2002.

(51) Int. Cl.
*H04L 9/08* (2006.01)
(52) U.S. Cl. .................. 380/279; 713/155
(58) Field of Classification Search .......... 380/279
See application file for complete search history.

(56) References Cited

U.S. PATENT DOCUMENTS

| 5,369,705 A | 11/1994 | Bird et al. ............. 380/21 |
| 5,412,723 A | 5/1995 | Canetti et al. ........... 380/21 |
| 5,491,750 A | 2/1996 | Bellare et al. ........... 380/21 |
| 5,495,533 A | 2/1996 | Linehan et al. .......... 380/21 |

(Continued)

FOREIGN PATENT DOCUMENTS

JP    9319673    12/1997

(Continued)

OTHER PUBLICATIONS

Tank Talk website www.tanktalk.net Mar. 14, 2002, 2 pages.

(Continued)

*Primary Examiner*—Matthew B Smithers
(74) *Attorney, Agent, or Firm*—David A. Farah; Sheldon Mak Rose & Anderson PC

(57) ABSTRACT

Methods, apparatuses, media and signals for facilitating secure communication between a first device and a second device are disclosed. One method includes automatically identifying a common key server potentially accessible by both the first and second devices, and obtaining a secure private key from the common key server, for use in encrypting communications between the first and second devices. Identifying may include identifying as the common key server, a key server at an intersection of a first communication path defined between a first key server having a previously established relationship with the first device and a master key server, and a second communication path defined between a second key server having a previously established relationship with the second device and the master key server. Obtaining may include obtaining a plurality of private keys and blending the keys to produce a final private session key.

94 Claims, 7 Drawing Sheets

U.S. PATENT DOCUMENTS

| | | | | |
|---|---|---|---|---|
| 5,729,608 | A | | 3/1998 | Janson et al. ............... 380/21 |
| 5,751,813 | A | * | 5/1998 | Dorenbos ................. 713/153 |
| 5,778,065 | A | | 7/1998 | Hauser et al. ............... 380/21 |
| 5,864,667 | A | * | 1/1999 | Barkan ..................... 726/10 |
| 6,154,541 | A | | 11/2000 | Zhang ..................... 380/28 |
| 6,785,809 | B1 | * | 8/2004 | Hardjono ................. 713/163 |
| 6,868,160 | B1 | * | 3/2005 | Raji ......................... 380/30 |
| 6,950,523 | B1 | * | 9/2005 | Brickell et al. ............. 380/286 |
| 7,143,443 | B2 | * | 11/2006 | Song et al. ................. 726/29 |
| 7,146,009 | B2 | * | 12/2006 | Andivahis et al. ........ 380/277 |
| 2002/0146119 | A1 | | 10/2002 | Liss ......................... 380/42 |
| 2002/0194473 | A1 | | 12/2002 | Pope et al. ................ 713/168 |
| 2003/0016821 | A1 | * | 1/2003 | Hammersmith ............. 380/37 |
| 2003/0018891 | A1 | | 1/2003 | Hall et al. ................. 713/160 |
| 2005/0055552 | A1 | * | 3/2005 | Shigeeda ................. 713/171 |

FOREIGN PATENT DOCUMENTS

| | | |
|---|---|---|
| WO | WO 98 17042 A | 4/1998 |
| WO | WO 01 74005 A | 10/2001 |

OTHER PUBLICATIONS

Secourier website www.secourier.com Mar. 14, 2002, 6 pages.

C. Blundo et al., "Perfectly-secure key distribution for dynamic conferences", 12th Annual International Cryptology Conference Proceedings, Santa Barbara, California, 1993 (Abstract only).

Carlo Blundo et al., "Key Distribution Schemes", IEEE, 1994, p. 496 (Abstract only).

M.T. El-Hadidi et al., "Performance Evaluation of a New Hybrid Encryption Protocol for Authentication and Key Distribution", IEEE, 1999, pp. 16-22.

M.T. El-Hadidi et al., "Performance Analysis of the Kerberos Protocol in a Distributed Environment", IEEE, 1997, pp. 235-239.

* cited by examiner

SESSION KEY DISTRIBUTION METHODS USING A HIERARCHY OF KEY SERVERS

CROSS-REFERENCE TO RELATED APPLICATIONS

This application claims priority from International Patent Application PCT/CA03/00275 entitled "Session Key Distribution Methods Using a Hierarchy of Key Servers." filed Feb. 28, 2003. which claims the benefit of priority from U.S. provisional patent application Ser. No. 60/364,621 filed Mar. 18, 2002, the contents of which are incorporated by reference herein in their entirety.

BACKGROUND OF THE INVENTION

1. Field of Invention

The present invention relates to communications, and more particularly, to methods, apparatuses, media, signals and computer program products for facilitating secure communications between a first device and a second device:

2. Description of Related Art

It is often desirable to have secure communications between first and second devices. For example, the devices may include respective desktop, laptop or handheld computers, in communication with each other over a public network such as the Internet. It is frequently desirable to allow these devices to transmit sensitive information securely to one another over the Internet, without significant risk of interception by unauthorized eavesdroppers. In many instances, it is desirable to attempt to arrange secure communication between the first and second devices, even if the first and second devices have never previously communicated with each other before. For example, a patent attorney or other lawyer may wish to communicate sensitive secret client information to a new client over the Internet, but may wish to minimize the risk of unauthorized interception of such information. Or, as a further example, a purchaser may wish to transmit sensitive payment account information such as credit card information to a vendor over the Internet.

Numerous conventional secure communications methods exist. The methods that are most commonly used over the Internet at present (such as SSL) employ an infrastructure based upon asymmetric encryption. In asymmetric encryption, two keys are used: a private key that is kept secret or private, and a public key that is accessible by every computer on the Internet. However, the current asymmetric encryption methods (as do any other secure communications methods) have potential inherent security risks that may be exploitable. Such risks may be partly addressed by symmetrical encryption methods, wherein only a single symmetrical key (referred to herein as a private key) is used, and key distribution schemes are adopted to attempt to securely provide the private key to the parties that wish to communicate.

A number of key distribution schemes have been proposed to attempt to provide two users or clients with a private key for communication therebetween. However, these schemes tend to presume that both of the two clients already have pre-existing relationships with the same trusted intermediary server, and have previously exchanged mutual keys with the server to allow them to establish secure communications with the trusted intermediary server. Such schemes also tend to presume that each of the two users is also aware that both users have pre-existing relationships with the trusted intermediary, and that the trusted intermediary in question is therefore a suitable server to select for execution of the key distribution scheme. In many cases, however, particularly where two users are in communication with each other via a large public wide area network such as the Internet, neither of the two users will have any knowledge of the other's pre-existing relationships with key servers, and indeed, many unsophisticated computer users may not have any knowledge of their own pre-existing relationships with key servers. Thus, even if a trusted intermediary with pre-existing relationships with both users exists, the users may not be aware of this fact and may not know to select the trusted intermediary for this purpose. In addition, in many cases the group of key servers with which one user has pre-existing relationships will not include any of the key servers with which the other user has pre-existing relationships, with the result that a trusted intermediary is not available to participate in the key distribution scheme. These problems would tend to arise unless mutual keys had been pre-established at both a client-server level and a server-server level over all domains, which would not be practical for a large network such as the Internet that includes a very large number of domains.

Accordingly, there is a need for an improved secure communications method.

SUMMARY OF THE INVENTION

In accordance with another aspect of the invention, there is provided a method of facilitating secure communication between first and second devices. The method includes automatically identifying a common key server potentially accessible by both the first and second devices, and obtaining a secure private key from the common key server, for use in encrypting communications between the first and second devices.

Advantageously, as the method includes automatically identifying a common key server potentially accessible by both the first and second devices, it is not necessary for the first and second devices to know the identity of the common key server in advance, nor is it necessary for them to have previously exchanged mutual keys with the common key server. It is sufficient for the first and second devices to know that they wish to communicate securely with each other, and for each of the devices to have a parent key server (not necessarily the same key server). In addition, as a private key is obtained for encryption purposes, the method is not susceptible to potentially exploitable security weaknesses associated with asymmetric encryption.

Identifying the common key server may include transmitting identifications of key servers from one of the first and second devices to the other of the first and second devices. Identifying may further include producing a first list of key servers potentially accessible by the first device.

Producing may include including in the first list, identifications of key servers associated with first device keys stored in a storage medium of the first device. Producing may further include including in the first list, identifications of intermediate key servers interposed along secure communications paths between each of the key servers associated with the first device keys and a master key server.

Transmitting may include transmitting the first list from the first device to the second device. Identifying may further include receiving at the first device, from the second device, an identification of the common key server.

Identifying may include receiving at the second device, a first list of key servers potentially accessible by the first device. Identifying may further include producing a second list of key servers potentially accessible by the second device. Producing may include including in the second list, identifications of key servers associated with second device keys stored in a storage medium of the second device. Producing may further include including in the second list, identifications of intermediate key servers interposed along secure communications paths between each of the key servers associated with the second device keys and a master key server.

Identifying may further include comparing the first and second lists, and identifying, as the common key server, a key server identified in both lists.

Identifying may include identifying as the common key server, from among a group of key servers each of which is identified in both the first and second lists, the key server having the shortest communications paths to the first and second devices. Advantageously therefore, in such embodiments, the time required to obtain the private key is potentially reduced in comparison to systems that always rely on a single key server.

Identifying may include identifying as the common key server, a key server at an intersection of a first communication path defined between a first key server having a previously established relationship with the first device and a master key server, and a second communication path defined between a second key server having a previously established relationship with the second device and the master key server. Advantageously therefore, in such embodiments, it is not necessary for the first and second devices to have a previously-established relationship with the same, single trusted intermediary in order to establish secure communications between themselves.

Transmitting may include transmitting, from the second device to the first device, an identification of the common key server. Transmitting may further include transmitting, from the second device to the first device, identifications of any intermediate key servers interposed between the first device and the common key server.

Identifying may further include identifying intermediate key servers interposed along a communications path between one of the first and second devices and the common key server. Obtaining may include obtaining the private key from one of the intermediate key servers that has received the private key from the common key server.

Obtaining may include receiving the private key from the common key server via a secure communications channel. Receiving may include receiving the private key from an intermediate key server that has received the private key from the common key server.

Obtaining may further include transmitting a request message to the common key server to request the common key server to transmit the private key. Transmitting may include transmitting the request message to an intermediate key server, for relay to the common key server.

The method may further include validating the private key. Validating may include receiving a first hash value produced by the common key server in response to the private key, generating a second hash value in response to the received private key, and comparing the first and second hash values.

Obtaining may include obtaining first and second private keys from at least one of the common key server and a second common key server potentially accessible by both the first and second devices. Obtaining first and second private keys may include obtaining a private user key from a common user key server and a private device key from a common device key server.

The method may further include obtaining an initial session key. Obtaining the initial session key may include receiving the initial session key at the first device. Alternatively, from the perspective of the second device, obtaining the initial session key may include generating the initial session key at the second device and transmitting the initial session key to the first device.

The method may further include encrypting communications between the first and second devices, in response to the private key. In embodiments where first and second private keys are received, this may include encrypting communications between the first and second devices, in response to the first and second private keys. Similarly, in embodiments where an initial session key is additionally received, this may include encrypting communications between the first and second devices, in response to the first and second private keys and the initial session key. Encrypting may include blending the first and second private keys and the initial session key to produce a modified key.

Blending may include encrypting at least one of the first and second private keys and the initial session key using at least one other of the first and second private keys and the initial session key. For example, blending may include encrypting the first private key using the second private key to produce a once-encrypted key. Similarly, blending may further include encrypting the once-encrypted key using the initial session key to produce a twice-encrypted key. Blending may further include generating a hash value in response to the twice-encrypted key, and appending the hash value to the twice-encrypted key. Blending may further include deleting a portion of the twice-encrypted key other than the hash value appended thereto, the deleted portion having a length equal to the hash value appended thereto. Blending may further include repeating the steps of generating and appending a hash value to the twice-encrypted key and deleting a portion of the twice-encrypted key until the twice-encrypted key has been entirely replaced with appended hash values. Advantageously, in such embodiments, the final private session key so generated is a truly private key, with no corresponding root keys stored in a software program or on the device or on a publicly accessible key server. As the final private session key has not been directly transmitted over the Internet (or other network) at all, and no devices other than the first and second devices have all the data necessary to create the final private session key, security is considerably enhanced as compared to conventional secure communications systems.

More generally, if desired, encrypting may include encrypting communications between the first and second devices using a blended key produced in response to the private key.

Encrypting may include initiating a cipher communications session with the blended key. Initiating may include executing a modified ARC4 streaming cipher communications session. Executing may include repeating a shuffling loop of the ARC4 streaming cipher communications session, a prime number of times greater than two.

In accordance with another aspect of the invention, there is provided an apparatus for facilitating secure communication between first and second devices. The apparatus includes a processor circuit capable of communication with a network. The processor circuit is configured to identify a common key server potentially accessible by both the first and second devices. The processor circuit is also configured to obtain a secure private key from the common key server, for use in encrypting communications between the first and second devices.

The processor circuit may be configured to carry out the various methods disclosed herein.

In accordance with another aspect of the invention, there is provided an apparatus for facilitating secure communication between first and second devices. The apparatus includes means for identifying a common key server potentially accessible by both the first and second devices. The apparatus further includes means for obtaining a secure private key from the common key server, for use in encrypting communications between the first and second devices.

The apparatus may further include means for performing the various functions disclosed herein.

In accordance with another aspect of the invention, there is provided a method of facilitating secure communications between first and second devices. The method includes receiving, at an intermediate key server, a request message from one of the first and second devices requesting a private key. The method further includes relaying the request message to a common key server potentially accessible by both the first and second devices. Similarly, in accordance with another aspect of the invention, there is provided an apparatus for facilitating secure communications between first and second devices. The apparatus includes an intermediate key server, including a processor circuit configured to carry out the above method. In accordance with another aspect of the invention, there is provided an apparatus including an intermediate key server. The intermediate key server includes means for performing the above functions.

In accordance with another aspect of the invention, there is provided a method of facilitating secure communications between first and second devices. The method includes receiving, at a common key server potentially accessible by both the first and second devices, request messages from first and second intermediate servers interposed between the common key server and the first and second devices respectively, requesting a private key. The method further includes generating and transmitting the private key to the first and second intermediate servers in response to the request messages, for relay to the first and second devices. Similarly, in accordance with another aspect of the invention, there is provided an apparatus for facilitating secure communications between first and second devices. The apparatus includes a common key server potentially accessible by both the first and second devices. The common key server includes a processor circuit configured to carry out the above method. In accordance with another aspect of the invention, there is provided an apparatus including a common key server potentially accessible by both the first and second devices. The common key server includes means for performing each of the above functions.

In accordance with another aspect of the invention, there is provided a computer program including code means that when executed on a computer carry out all the steps of any of the methods disclosed herein. Similarly, in accordance with another aspect of the invention, there is provided a computer program on a carrier carrying codes that when executed on a computer carry out all the steps of any of the methods disclosed herein. In accordance with another aspect of the invention, there is provided a computer-readable medium storing code segments for directing a processor circuit to carry out any of the methods disclosed herein. In accordance with another aspect of the invention, there is provided a signal embodied in a communications medium, the signal including code segments for directing a processor circuit to carry out any of the methods disclosed herein. In accordance with another aspect of the invention, there is provided a signal embodied in a carrier wave, the signal including code segments for directing a processor circuit to carry out any of the methods disclosed herein.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
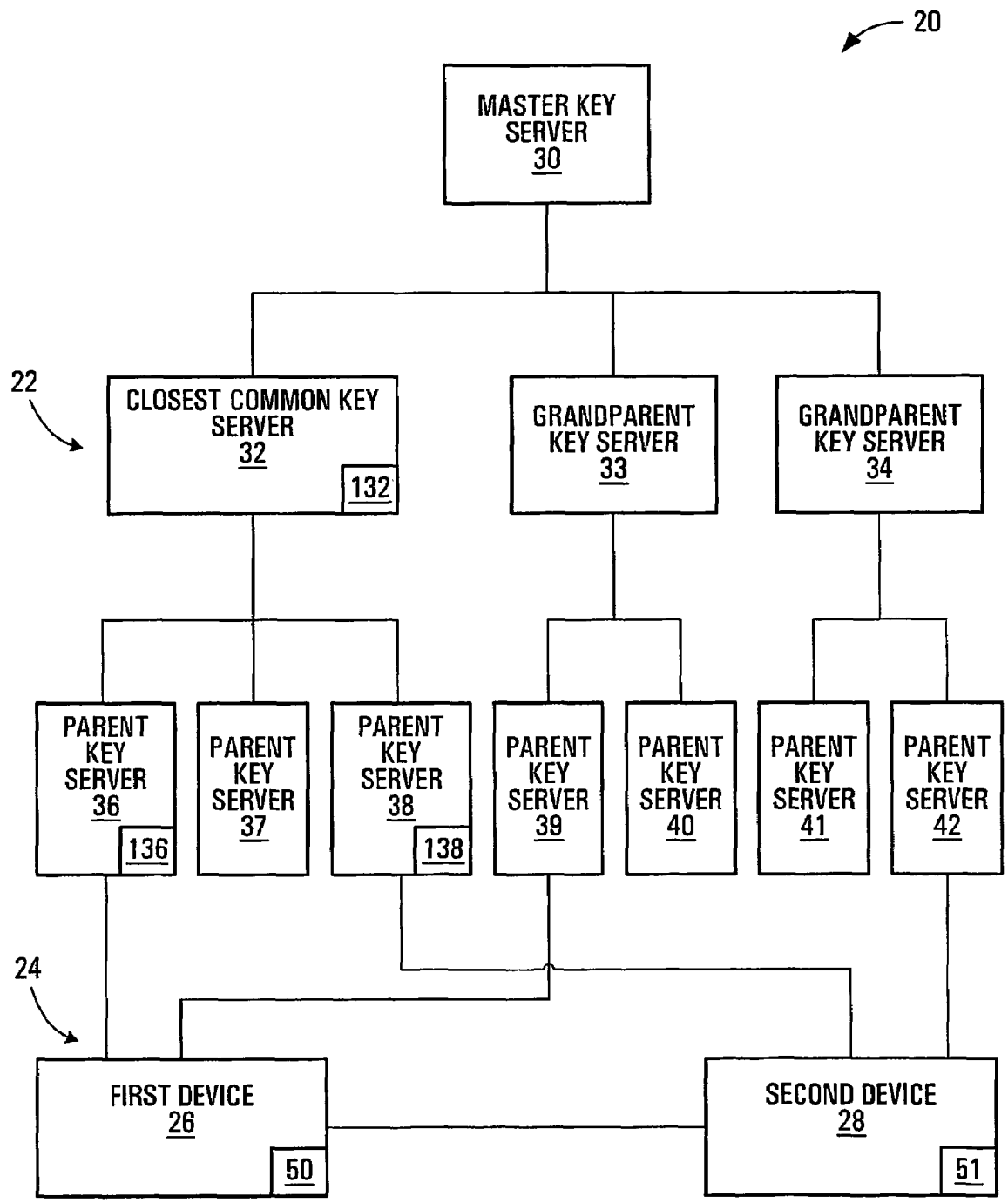
FIG. 1 is a block diagram of a public network in which a plurality of user devices is in communication with a plurality of key servers.

Referring to FIG. 1, an apparatus for facilitating secure communication between first and second devices according to a first embodiment of the invention is shown generally at 20. In this embodiment, the apparatus 20 includes a processor circuit 50 capable of communication with a network. The processor circuit is configured to identify a common key server 32 potentially accessible by both a first device 26 and a second device 28. The processor circuit 50 is configured to obtain a secure private key from the common key server 32, for use in encrypting communications between the first and second devices 26 and 28. In this embodiment, the term "accessible" does not require direct accessibility, but can also include indirect accessibility, and therefore does not imply the necessity of any previously established direct relationship between the first device and the common key server, nor between the second device and the common key server.

In this embodiment, the processor circuit 50 is housed within the first device 26. In the present embodiment, the second device 28 also includes a processor circuit 51 similar to the processor circuit 50. Like the processor circuit 50 of the first device 26, the processor circuit 51 of the second device 28 is also configured to identify the common key server potentially accessible by both devices, and to obtain a secure private key from the common key server for use in encrypting communications.

Figure 2:
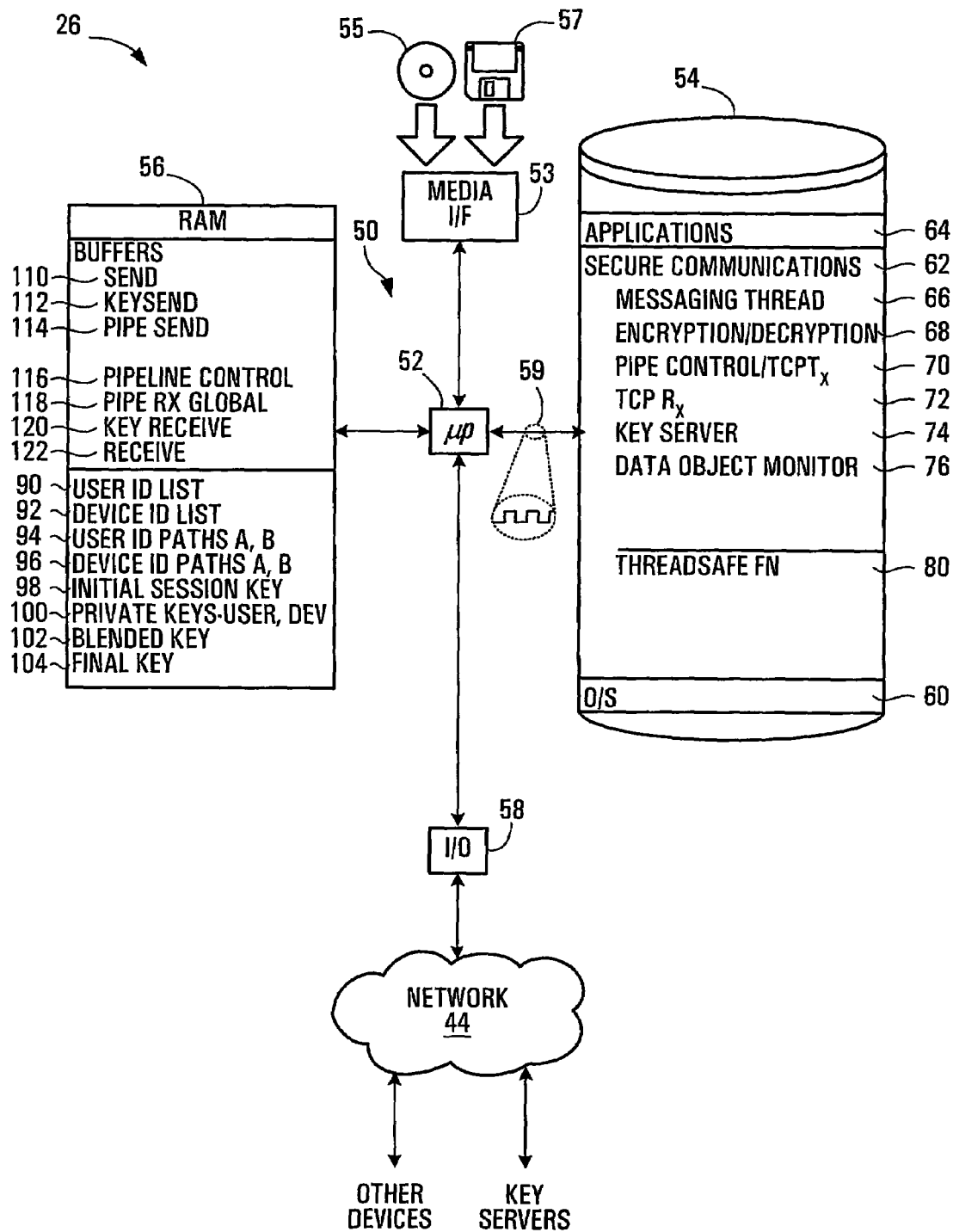
FIG. 2 is a block diagram of an apparatus for facilitating secure communication between first and second devices shown in FIG. 1, according to a first embodiment of the invention.

Referring to FIGS. 1 and 2, in this embodiment, the first and second devices 26 and 28 are merely two illustrative examples of a larger plurality of user devices 24. Each of the plurality of user devices 24 is capable of communication with each other and with one or more of a plurality of key servers shown generally at 22 via a public network 44, which in this embodiment includes the Internet.

In the present embodiment, the first device 26 and the second device 28 include respective desktop computers. Alternatively, however, the first and second devices may include personal communication devices. For example, the first and second devices may include personal computing devices, such as desktop or laptop computers, or may include handheld computing devices such as handheld computers or e-mail devices, for example. Alternatively, however, the first and second devices need not include user or client devices, but may alternatively include other devices such as servers, for example, or more generally, may include any other suitable type of communications devices.

In this embodiment, the first and second devices 26 and 28 wish to establish a secure communication connection therebetween, but have not securely communicated with one another previously, and neither device has any advance knowledge of the identities of any key servers that may be available to the other device. More particularly, the first and second devices 26 and 28 wish to establish a direct communications connection that does not suffer from security weaknesses associated with conventional secure communications methods, for transmission of particularly sensitive information therebetween. Alternatively, however, the present embodiment may be used equally well between devices that have securely communicated in the past.

In this embodiment, the key servers 22 may include any suitable computing devices capable of executing key server functionality, such as general-purpose or specialized-purpose desktop computers, for example.

In the present embodiment, the key servers 22 include a master key server 30, which is capable of secure communications with every other one of the key servers 22, either directly, or indirectly via one or more separate secure connections with one or more intermediate key servers. Thus, in the illustrative example shown in FIG. 1, the key servers 22 further include a plurality of intermediate key servers, such as key servers 32, 33 and 34 for example, and a plurality of further key servers, such as key servers 36, 37, 38, 39, 40, 41 and 42 shown in FIG. 1. Alternatively, it will be appreciated that virtually any number or relative configuration of key servers may be substituted. For example, any key server in the key server "tree" shown in FIG. 1 may act as a "parent" server to any other key server on the tree. Similarly, it will be appreciated that a much larger number of key servers, including a much larger number of intermediate key servers between each of the first and second devices 26 and 28 and the master key server 30, may be present in a particular embodiment, for example.

In this embodiment, each one of the first and second devices 26 and 28 has a previously defined relationship with at least one of the key servers 22, which has previously issued a key to the device and thus acts as a "parent" key server for the device.

More particularly, in the illustrative example shown in FIG. 1, each of the key servers 36 and 39 acts as a "parent" key server for the first device 26, and each of the key servers 38 and 42 acts as a "parent" key server for the second device 28. Thus, in the present embodiment, it assumed that none of the key servers 22 acts as a "parent" to both the first and second devices, or in other words, there is no shared key server with which both the first and second devices both have previously-defined relationships. In other words, in contrast with conventional private key distribution schemes, in the present embodiment it is assumed that there is no single key server with which both the first and second devices have previously established respective key pairs, to allow each of them to securely communicate with the key server. Alternatively, however, the present embodiment of the invention may also be applied to situations where such a shared key server exists.

Similarly, in the present embodiment, the key server 32 acts as a "parent" to key servers 36, 37 and 38, the key server 33 acts as a "parent" to key servers 39 and 40, and the key server 34 acts as a "parent" to key servers 41 and 42. For illustrative purposes, the key servers 32, 33 and 34 are therefore referred to as "grandparent" key servers from the perspective of the first and second devices 26 and 28. The master key server 30 acts as a parent to key servers 32, 33 and 34.

In this embodiment, each of the key servers 22 and the first and second devices 26 and 28 is capable of establishing a secure communication connection with its own immediate "parent" server, with which it has previously established secure communications. For example, in this embodiment, it is assumed that each device or server was previously assigned a user-ID and password to initially communicate with its own immediate parent. During this initial communication between each device or server and its parent key server, a hash value of the password is used as a session key, to allow the parent to securely transmit a private key to the "child" device or server. Once the private key has been initially securely transmitted, the device or server may securely communicate with its parent server using the encryption methods described herein, but without the necessity of obtaining a new private key as described below in connection with FIG. 3. Also during the initial communication between each device or server and its immediate parent key server, the device or server requests its immediate parent to transmit key server path information identifying the path from the immediate parent key server to the master key server 30. For example, during the initial communication between the first device 26 and the parent key server 39, the parent key server 39 transmits path information to the first device 26, identifying the parent key server 39, the grandparent key server 33, and the master key server 30. Upon receiving this information from the key server 39, the first device 26 stores the received path information locally in a hard disk drive or other storage medium thereof, in association with the private key received from the parent key server 39, for future use as described herein. Similarly, during its initial communication with the parent key server 36, the first device 26 receives and stores path information identifying the parent key server 36, the closest common key server 32, and the master key server 30, and stores such information locally in association with a key associated with the key server 36. Likewise, the second device 28, during its initial communication with the parent key server 42, receives and stores path information identifying the parent key server 42, the grandparent key server 34, and the master key server 30, and stores this information locally in association with the key received from the parent key server 42. Also in this embodiment, during its initial communication with the parent key server 38, the second device 28 receives and stores path information identifying the parent key server 38, the closest common key server 32, and the master key server 30, and stores this path information locally in association with a key received from the key server 38. It is assumed that each of the parent key servers 36 through 42 has previously received and locally stored its own upstream path information leading to the master server 30, during its own initial communication with its immediate parent server (such as the grandparent servers 33 and 34 or the common key server 32).

Referring to FIGS. 1 and 2, the processor circuit of the first device 26 is shown generally at 50 in FIG. 2. In the present embodiment, the first and second devices 26 and 28 are identical, and thus the processor circuit 51 of the second device 28 is identical to the processor circuit 50 of the first device 26 shown in FIG. 2. Thus, for ease of illustration, only the processor circuit 50 is described in detail, it being understood that the processor circuit 51 includes similar structural and functional features. Alternatively, as noted above, the first and second devices may include different types of devices if desired.

Similarly, in this embodiment, each of the key servers 22 shown in FIG. 1 has a processor circuit similar to the processor circuit 50, such as a processor circuit 132 of the common key server 32, a processor circuit 136 of the key server 36, and a processor circuit 138 of the key server 38, for example. If desired, these processor circuits may also be capable of the full functionality of the processor circuit 50 described below. Alternatively, however, as will be apparent, for the purposes of the present embodiment of the invention, the key servers 22 do not require the full range of functionality provided by the secure communications routine 62, but rather, may be provided with an alternative routine to merely direct their respective processor circuits to receive and respond to signals as discussed below.

In this embodiment, the processor circuit 50 includes a microprocessor 52. More generally, however, in this specification, the term "processor circuit" is intended to broadly encompass any type of device or combination of devices capable of performing the functions described herein, including (without limitation) other types of microprocessors, microcontrollers, other integrated circuits, other types of circuits or combinations of circuits, logic gates or gate arrays, or programmable devices of any sort, for example, either alone or in combination with other such devices located at the same location or remotely from each other, for example. Additional types of processor circuits will be apparent to those ordinarily skilled in the art upon review of this specification, and substitution of any such other types of processor circuits is considered not to depart from the scope of the present invention as defined by the claims appended hereto.

In the present embodiment, the microprocessor 52 is in communication with a first computer readable medium, which in this embodiment includes a hard disk drive 54. The microprocessor 52 is in further communication with a second computer readable medium, which in this embodiment includes a random access memory (RAM) 56. The microprocessor 52 is in further communication with an input/output (I/O) interface 58, through which the microprocessor communicates with the various key servers 22 and other user devices 24, via the public network 44. Also in this embodiment, the microprocessor 52 is in communication with a media interface device 53, to allow the microprocessor 52 to read data from or write data to other types of computer readable media, such as a compact disc 55 or a floppy diskette 57, for example. If desired, the microprocessor may be in further communication with other types of computer readable media, such as magnetic disks or diskettes, optical storage devices, magnetic tapes, random access memories (RAMs), programmable read-only memories such as EPROMs, EEPROMs or FLASH memories, for example, or any other type of memory device, either at the location of the processor circuit or located remotely therefrom, for example.

In this embodiment, the hard disk drive 54 acts as a program memory for storing various routines executable by the processor circuit 50. Alternatively, however, it will be appreciated that the hard disk drive 54 is merely one example of a computer-readable medium for storing such routines. More generally, any other suitable type of medium, such as those noted above or others for example, or any other suitable way of generating a signal such as that shown at 59 including code segments for directing the microprocessor 52 to carry out the functions described herein, may be substituted. Such a signal may be embodied in a communications medium, such as a data bus or other link to the network 44, or a carrier wave for example, and thus, the routines may be provided as downloaded applets or other executable instructions received from a remote source, if desired.

In the present embodiment, the routines stored on the hard disk drive 54 executable by the processor circuit 50 include an operating system 60, a secure communications routine 62, and various user applications 64. In this embodiment, the secure communications routine 62 includes a dynamic link library for directing the processor circuit to execute a number of threads, including a messaging thread 66, an encryption/decryption thread 68, a pipe control/TCP send thread 70, a TCP receive thread 72, a key server thread 74, and a data object monitor thread 76. If desired, multiple instances of such threads may be defined and executed by the processor circuit. In this embodiment, the secure communications routine 62 further includes a threadsafe function 80 that the processor circuit may invoke under the direction of any of the various threads, to ensure proper handling of shared data space such as shared data buffers or registers and fields therein, for example.

When executed by the processor circuit 50, the secure communications routine 62 configures or programs the processor circuit to define various registers in the RAM 56, including a user-ID list register 90, a device-ID list register 92, a user-ID paths register 94, a device-ID paths register 96, an initial session key register 98, a private keys register 100, a blended key register 102, and a final private session key register 104. Similarly, the secure communications routine 62 configures the processor circuit to define various buffers for use in secure encrypted communications, including a send buffer 110, a key send buffer 112, a pipe send buffer 114, a pipeline control buffer 116, a key receive buffer 120, and a receive buffer 122.

It will be appreciated that numerous other registers and buffers may similarly be defined and used by the processor circuit under the direction of the secure communications routine 62.

In this embodiment, the user applications 64 do not interface directly with the TCP/IP functionality of the operating system 60. Rather, the user applications 64 interface with the secure communications routine 62, which establishes and handles all TCP/IP communications. To facilitate this interface with the user applications 64, in the present embodiment the secure communications routine 62 is provided in the form of a dynamic link library (.dll) file, which in this embodiment requires approximately 150 kB of storage space in the hard disk drive 54. In this embodiment, although the secure communications routine 62 is described below as having a single set of threads for illustrative purposes, more generally, the secure communications routine 62 of the present embodiment is multithreaded. For example, if a particular user application creates a plurality of client objects, each client object will have its own corresponding set of threads for its own respective secure communications session. Similarly, if the first device is acting as a server, with a plurality of connected clients, a separate set of threads will be executed for each client. All such multithreading occurs transparently to the user application, which need not be multithreaded itself, and need not synchronize the various sets of threads.

In a particular embodiment, if the operating system 60 includes a Windows operating system, it may be preferable for Windows Message Notification for TCP to be deactivated. In a Windows environment, the send and receive operations of TCP are preferably in endless loops, and exit only if the communications session collapses. Other potential exit triggers, such as timeouts, are preferably disabled, as some timeouts may occur in certain embodiments if particular buffers temporarily fill.

MESSAGING THREAD

Figure 3:
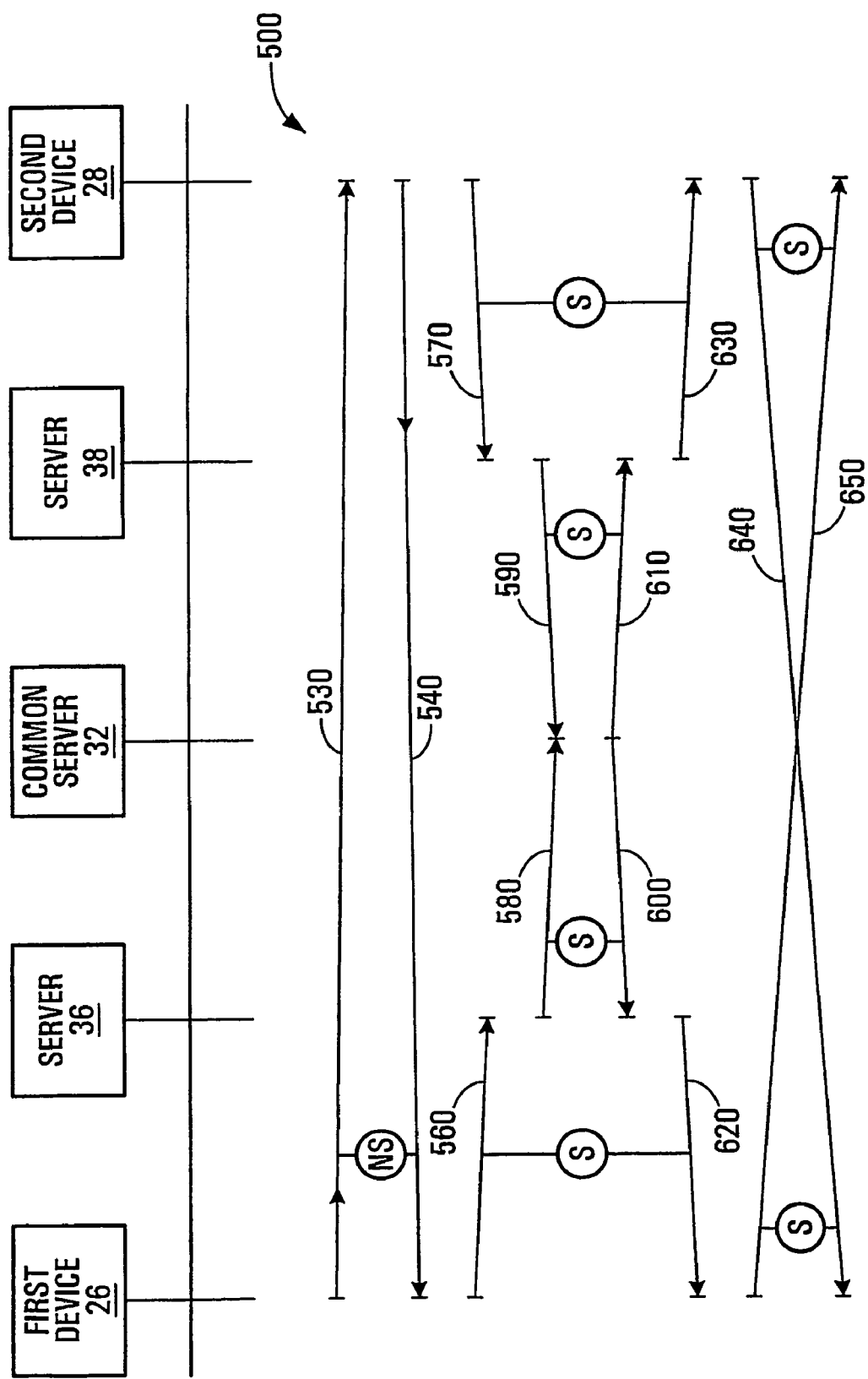
FIG. 3 is a signal flow diagram illustrating signal flow among the devices and servers shown in FIG. 1.
Figure 4A:
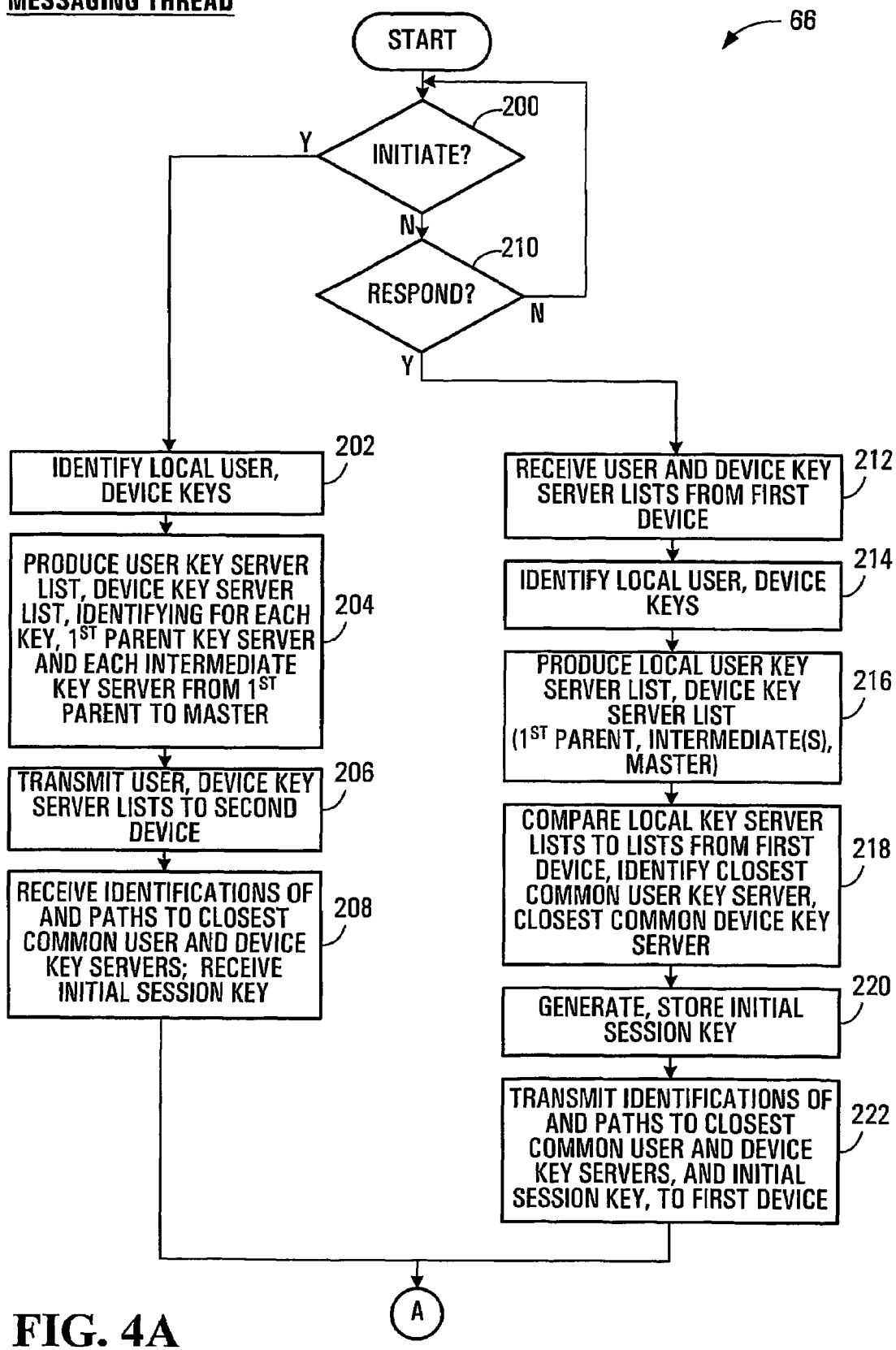
FIGS. 4A-4B are a flowchart of a messaging thread executed by a processor circuit of the apparatus shown in FIG. 2.
Figure 4B:
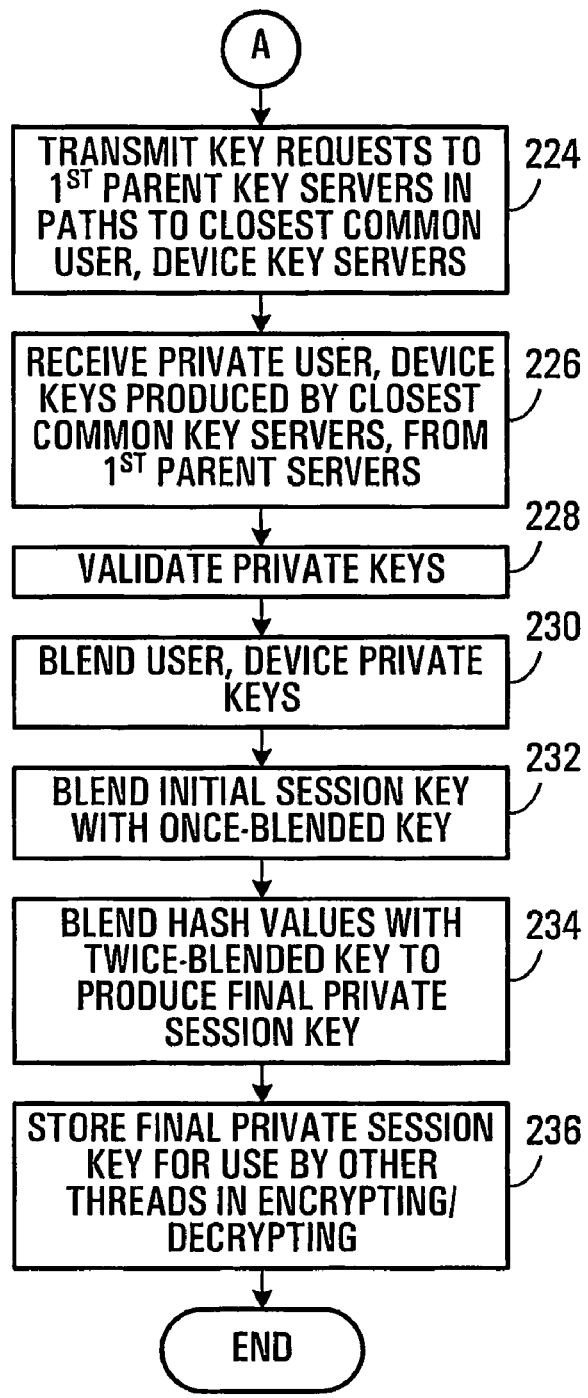
Figure 5:
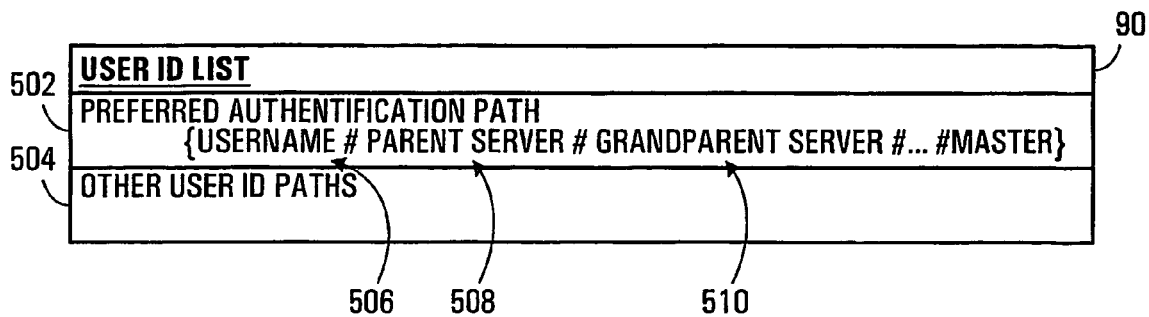
FIGS. 5-11 are tabular representations of various signals shown in FIG. 3.
Figure 6:
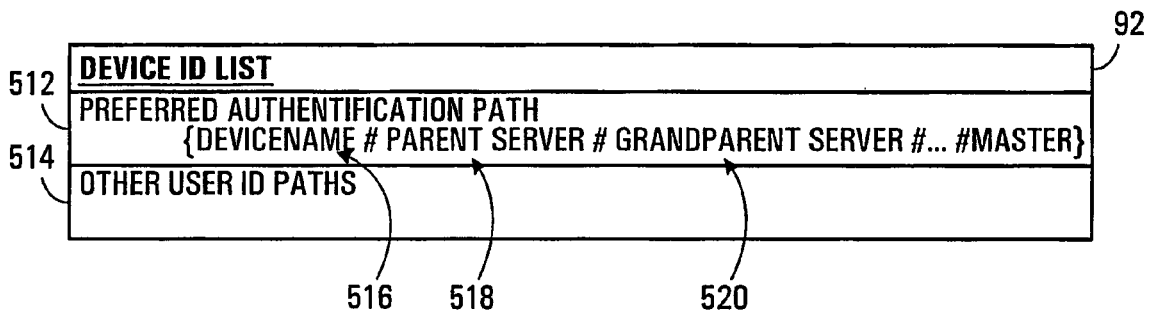

Referring to FIGS. 1 to 11, the messaging thread is shown generally at 66 in FIGS. 4A-4B. Generally, the messaging thread 66 configures or programs the processor circuit 50 to automatically identify a common key server potentially accessible by both the first and second devices 26 and 28, and to obtain a secure private key from the common key server, for use in encrypting communications between the first and second devices.

In the present embodiment, to identify the common key server and obtain the secure private key, the messaging thread 66 configures the processor circuit 50 to participate in a signal flow shown generally at 500 in FIG. 3.

Referring to FIGS. 1 to 4B, the messaging thread 66 begins with a first block 200 of codes shown in FIG. 4A, which directs the processor circuit 50 of the first device 26 to determine whether one of the user applications 64 being executed by the processor circuit 50 has requested the messaging thread 66 to initiate secure communications with another device, which is assumed for illustrative purposes to be the second device 28. If so, the processor circuit 50 is directed to execute blocks 202 to 208. If no such request to initiate communications has been received, the processor circuit is directed to determine whether a request for secure communications has been received from the second device 28 at the first device 26. If so, the processor circuit is directed to execute blocks 212 through 222.

In the present description of the messaging thread 66, for illustrative purposes, it is assumed that the first device 26 initiates communications with the second device 28, and thus the processor circuit 50 of the first device executes blocks 202 to 208 in FIG. 4A. Therefore, it is assumed that the second device 28 responds to the communications initiation request, and that the processor circuit 51 of the second device executes blocks 212 through 222. Alternatively, however, the second device 28 may initiate communications if desired, in which case the processor circuit 51 may execute blocks 202 to 208 and the processor circuit 50 may execute blocks 212 through 222. For illustrative purposes only, in the following description, the term "first device" is used to indicate the device initiating communications, and the term "second device" is used to indicate the device responding to the communications initiation request.

Accordingly, in the present illustrative example, to initiate secure communications between the first device 26 and the second device 28, blocks 202 to 206 of the messaging thread 66 direct the processor circuit 50 to transmit identifications of key servers from the first device to the second device. More particularly, blocks 202 and 204 direct the processor circuit 50 to produce a first list of key servers potentially accessible by the first device. Blocks 202 and 204 direct the processor circuit 50 to include in the first list, identifications of key servers associated with first device keys stored in a storage medium of the first device. More particularly still, in this embodiment block 202 directs the processor circuit 50 to examine the contents of the hard disk drive 54, and identify all device keys (associated with the particular device 26, regardless of the user using the device) and user keys (associated with the user of the device 26, no matter what device the user is using) used by the first device 26. Block 204 directs the processor circuit 50 to produce and store a user-ID list and a device-ID list, in the user-ID list register 90 and the device-ID list register 92, respectively, each list including a server path for each identified user or device key, respectively.

Referring to FIGS. 1, 2, 4A and 5, in this embodiment, block 204 further configures the processor circuit 50 to include in the first list, identifications of intermediate key servers interposed along secure communications paths between each of the key servers associated with the first device keys and a master key server. This is performed for each of the user-ID list and the device-ID list. More particularly, in this embodiment the processor circuit 50 is directed to store, in the user-ID list register 90, a first user-ID path 502 representing a server path corresponding to a default or preferred user-ID, and a plurality of additional or alternative user-ID paths 504. Each of the server paths 502 and 504 includes a name field 506 for storing a user name, a first "parent" key server field 508 for storing an identification of a first key server associated with the key, and a plurality of further key server fields 510, for storing identifications of all intervening key servers along a secure path leading to and including the master key server 30 shown in FIG. 1. For example, in the example shown in FIG. 1, the first device 26 uses a user-ID key associated with the key server 36, and thus, the relevant user-ID list entry includes a user name corresponding to the key, an identification of the key server 36, an identification of the common key server 32, and an identification of the master key server 30. In this regard, it will be recalled that during its prior initial communication with the key server 36 in which it obtained the user-ID key, the first device 26 will have received and locally stored path information identifying the key server path from the key server 36 to the master key server 30, which in this example includes identifications of the key server 36, an intermediate server, namely, the closest common key server 32, and the master key server 30 itself. In the present embodiment, during such prior initial communication with the key server 36, the first device receives and stores such information locally, in the hard disk drive 54, in association with the user-ID key associated with the key server 36. Thus, block 204 directs the processor circuit 50 to locate such path information stored in the hard disk drive 54 in association with the relevant user-ID key, and to copy the identifications of the key servers identified in the stored path information into the appropriate fields 508 and 510 of the relevant record in the user-ID list register 90 corresponding to the particular user-ID key. Alternatively, if desired, rather than relying upon the previously locally stored key server information, block 204 may direct the processor circuit 50 to signal the immediate parent key servers associated with each locally stored key (in the present example, the key server 36), and to request that the key server transmit updated key server path information to the first device 26. Similarly, the immediate parent key server may respond to such a request by either transmitting locally stored key server path information, or by requesting its own parent key server to provide updated key server path information. Generally, it is preferable to rely upon previously stored key server path information and update only occasionally, in order to minimize communications traffic associated with the key distribution process described herein.

Similarly, referring to FIGS. 1, 2, 4A and 6, block 204 directs the processor circuit to store, in the device-ID list register 92, a first device-ID path 512 representing a server path corresponding to a default or preferred device-ID, and a plurality of additional or alternative device-ID paths 514. Each of the server paths 512 and 514 includes a name field 516 for storing a device name, a first "parent" key server field 518 for storing an identification of a first key server associated with the key, and a plurality of further key server fields 520, for storing identifications of all intervening key servers along a secure path leading to and including the master key server 30 shown in FIG. 1.

Referring to FIGS. 1, 2, 3, 4A, 5 and 6, in this embodiment block 206 then directs the processor circuit 50 to transmit the first list, or more particularly, the user-ID list and the device-ID list, from the first device 26 to the second device 28. More particularly, block 206 directs the processor circuit 50 of the first device 26 to transmit, to the second device 28, a signal 530 shown in FIG. 3. In this embodiment, the signal 530 includes the contents of the user-ID list register 90 shown in FIG. 5, and the contents of the device-ID list register 92 shown in FIG. 6. As a secure communications connection has not been established between the first and second devices 26 and 28, the signal 530 is transmitted to the second device 28 in a non-secure manner, over the Internet.

Referring to FIGS. 1, 2, 3, 4A, 5 and 6, as discussed above, it will be appreciated that another instance of the messaging thread 66 is being executed by the processor circuit 51 of the second device 28. Upon receiving the signal 530, block 210 of the messaging thread 66 directs the processor circuit 51 to block 212 shown in FIG. 4A, which directs the processor circuit 51 to receive at the second device, a first list of key servers potentially accessible by the first device. More particularly, block 210 directs the processor circuit 51 to receive and store the contents of the signal 530, including the contents of the user-ID list register 90 and the device-ID list register 92.

Blocks 214 and 216 then direct the processor circuit 51 of the second device to produce a second list of key servers potentially accessible by the second device, and to include in the second list, identifications of key servers associated with second device keys stored in a storage medium of the second device. Block 216 directs the processor circuit 51 to include in the second list, identifications of intermediate key servers interposed along secure communications paths between each of the key servers associated with the second device keys and a master key server. To achieve this, blocks 214 and 216 direct the processor circuit 51 to examine its own hard disk drive or other storage medium, to identify all user keys and device keys used by the second device 28, and to locally store user-ID and device-ID key server path information similar to that shown in FIGS. 5 and 6, in a manner similar to that discussed above in connection with blocks 202 and 204.

Block 218 then directs the processor circuit 51 of the second device 28 to compare the first and second lists, and identify, as the common key server, a key server identified in both lists. Generally, in this embodiment block 218 configures the processor circuit 51 to identify as the common key server, from among a group of key servers each of which is identified in both the first and second lists, the key server having the shortest communications paths to the first and second devices. More particularly, block 218 configures the processor circuit 51 to identify as the common key server, a key server at an intersection of a first communication path defined between a first key server having a previously established relationship with the first device and a master key server, and a second communication path defined between a second key server having a previously established relationship with the second device and the master key server. This is carried out separately for both the first and second user-ID lists for the first and second devices, and for the first and second device-ID lists for the first and second devices. To achieve this, block 218 directs the processor circuit to compare the user and device-ID lists of the first and second devices, and to identify a closest common user-ID key server and a closest common device-ID key server, that appear in the respective user-ID lists and device-ID lists of both the first and second devices. For example, in the illustrative example shown in FIG. 1, the second device 28 uses a user-ID key associated with the key server 38, which follows a key server path through the common key server 32 to the master key server 30, and also uses another user-ID key associated with the key server 42, which follows a key server path through the key server 34 to the master key server 30. It will be recalled that the first device 26 has a user-ID key associated with the key server 36, which follows a key server path through the common key server 32 to the master key server 30. Thus, in this example, the closest common user-ID key server is the common key server 32. (There will always be at least one common key server, namely, the master key server 30, however, in many cases a closer common key server, such as the common key server 32 in the present example, will be present.)

Referring to FIGS. 1, 2, 3, 4A and 7, after identifying the closest common user-ID key server and the closest common device-ID server, block 220 directs the processor circuit 51 of the second device 28 to obtain an initial session key. More particularly, block 220 directs the processor circuit 51 to generate the initial session key at the second device, and store it in the local initial session key register (similar to the initial session key register 98 at the first device 26). More particularly still, in this embodiment block 220 directs the processor circuit 51 to generate an 8-kilobit key for use as the initial session key.

In this embodiment, block 222 then directs the processor circuit 51 to transmit, from the second device 28 to the first device 26, an identification of the common key server. Block 222 also directs the processor circuit 51 to transmit, from the second device to the first device, identifications of any intermediate key servers interposed between the first device and the common key server. In the present embodiment, block 222 also directs the processor circuit 51 to transmit the initial session key to the first device. To achieve this, block 222 directs the processor circuit 51 of the second device to generate and transmit a signal 540 to the first device 26. As a secure communications connection has not been established between the first and second devices 26 and 28, the signal 540 is transmitted to the first device 26 via a non-secure Internet connection established in connection with transmission of the signal 530 discussed above. In this embodiment, the signal 540 includes a first device user-ID path field 542, a second device user-ID path field 544, a first device device-ID path field 546, a second device device-ID path field 548, and an initial session key field 550. The first device user-ID path field 542 stores path information from the first device 26 to the closest common user-ID key server. To produce the first device user-ID path field 542 contents, the processor circuit 51 of the second device locates the relevant server path record from the user-ID list received from the first device 26 (i.e., a record containing an identification of the common key server 32), but truncates this server path information at the closest common user-ID key server, so that the last sub-field in the first device user-ID path field 542 is a common key server sub-field 543 identifying the closest common user-ID key server, which in this example is the common key server 32. The second device user-ID path field 544 includes path information identifying the path that the second device 28 will use to communicate with the closest common user-ID key server. Thus, in the example shown in FIG. 1, the second device user-ID path field 544 includes a user-ID sub-field, a first parent server sub-field identifying the key server 38, and a final server sub-field indicating the common key server 32. The fields 546 and 548 include analogous information, corresponding to the paths that the first and second devices will respectively use to communicate with the closest common device-ID key server (which may or may not be the same as the closest common user-ID key server). Effectively, therefore, the processor circuit 51 is configured to identify intermediate key servers interposed along a communications path between one of the first and second devices and the common key server, the identifications being stored in the fields 542, 544, 546 and 548. Finally, the initial session key field 550 includes the 8 kilobit initial session key generated by the processor circuit 51 of the second device 28 under the direction of block 220 above, for use in key-blending, as discussed below. In addition to transmitting the signal 540 to the first device 26, the processor circuit of the second device also stores all of the information contained in the signal 540 locally at the second device 28.

Following execution of block 222, the processor circuit 51 of the second device 28 is directed to block 224 of the messaging thread 66 shown in FIG. 4B, as discussed below in connection with the processor circuit 50 of the first device 26.

Referring to FIGS. 1, 2, 3, 4A and 7, block 208 then configures the processor circuit 50 of the first device 26 to receive at the first device, from the second device, an identification of the common key server. Block 208 also configures the processor circuit 50 to obtain an initial session key, by receiving the initial session key generated by the processor circuit 51 of the second device 28. To achieve the above, block 208 directs the processor circuit 50 to receive the signal 540, and store its contents in the RAM 56. More particularly, the processor circuit 50 stores the contents of the first device user-ID path field 542, the second device user-ID path field 544, the first device device-ID path field 546, the second device device-ID path field 548, and the initial session key field 550, in a first device sub-field of the user-ID paths register 94, a second device sub-field of the user-ID paths register 94, a first device sub-field of the device-ID paths register 96, a second device sub-field of the device-ID paths register 96, and the initial session key register 98, respectively.

Following execution of block 208, the processor circuit 50 of the first device 26 is directed to block 224 of the messaging thread 66 shown in FIG. 4B, as discussed below.

Referring to FIGS. 1, 2, 3 and 4B, in this embodiment, both the processor circuit 50 of the first device 26 and the processor circuit 51 of the second device 28 proceed to execute blocks 224 through 236 of the messaging thread 66, to obtain a secure private key for use in encrypting communications between the first and second devices. Generally, blocks 224 through 236 configure each of the processor circuits 50 and 51 to obtain first and second private keys from at least one of the common key server and a second common key server potentially accessible by both the first and second devices. More particularly, in this embodiment each of the processor circuits 50 and 51 is configured to obtain, as the first and second private keys, a private user key from a common user key server and a private device key from a common device key server. In this embodiment, the common user key server and the common device key server are the closest common user-ID key server and the closest common device-ID key server respectively, as identified above at block 218 (it will be recalled that these may be the same or a different server). To achieve this, blocks 224 through 236 configure the processor circuits 50 and 51 to use the key server path information contained in the signal 540, to cause two private session keys, namely, a user private session key and a device private session key, to be generated and securely transmitted by the closest common user-ID key server and by the closest common device-ID key server, respectively. Thus, referring to FIGS. 1, 2, 3, 4B, 7, 8 and 9, the first and second devices 26 and 28 contemporaneously transmit private key generation requests to their respective user-ID and device-ID key servers.

In this embodiment, block 224 configures the processor circuit 50 to transmit a request message to the common key server 32, to request the common key server to transmit the private key. More particularly, block 224 directs the processor circuit 50 to transmit the request message to an intermediate key server, for relay to the common key server. More particularly still, block 224 directs the processor circuit 50 to transmit a signal 560 to the first "parent" server identified in the first device sub-field of the user-ID paths register 94 (it will be recalled that the contents of this sub-field are identical to the contents of the first device user-ID path field 542 shown in Figure 7). Thus, in the example shown in FIG. 1, the first device 26 transmits the signal 560 to the key server 36. The signal 560 specifies the respective key server paths that the first device 26 and the second device 28 wish to use to respectively communicate with the common key server 32 identified last in each such path. More particularly, the signal 560 includes a first device field 562 having contents identical to those of the first device sub-field of the user-ID paths register 94, and a second device field 564 having contents identical to those of the second device sub-field of the user-ID paths register 94. The signal 560 is transmitted in a secure manner to the key server 36, via a secure connection established using a key corresponding to the key server path information contained in the first device sub-field of the user-ID paths register 94.

Figure 7:
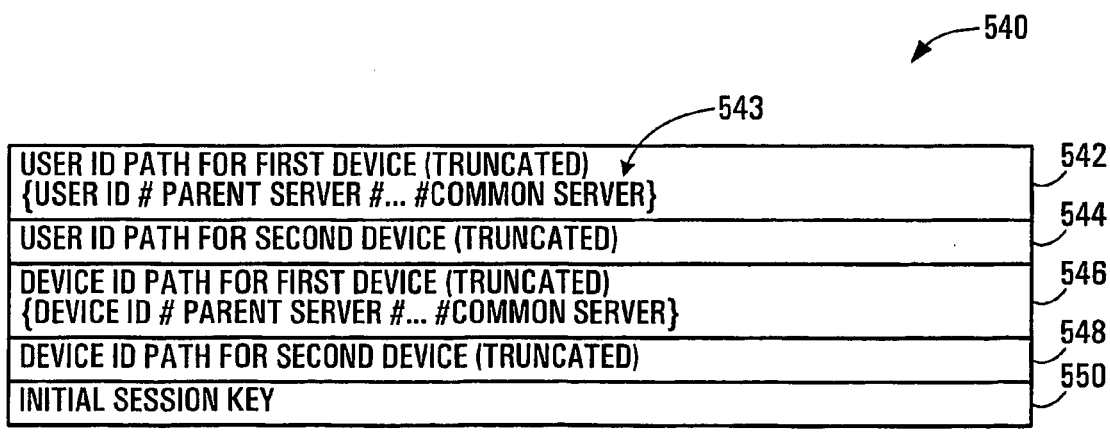
Figure 8:
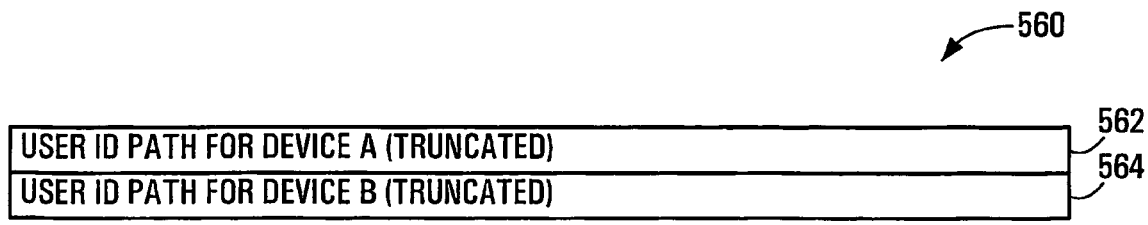
Figure 9:
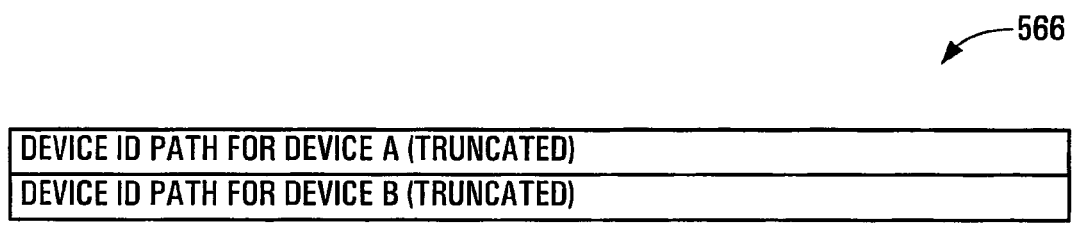

Similarly, to request a device private session key, block 224 also directs the processor circuit 50 of the first device 26 to transmit an analogous signal shown generally at 566 in FIG. 9, to the first "parent" server identified in the first device sub-field of the device-ID paths register 96 (it will be recalled that the contents of this sub-field are identical to the contents of the first device device-ID path field 546 shown in FIG. 7). In general, this first "parent" server for the device-ID path will not be the same server as for the user-ID path, however, it is possible for these two servers to coincide. As the manner in which the device private session key is obtained is identical to the manner in which the user private session key is obtained, for ease of illustration, only the generation and transmission of the user private session key is described and illustrated herein.

Referring to FIGS. 1, 2, 3, 4B, 7, 8 and 9, block 224 of the instance of the message thread 66 concurrently executing on the processor circuit 51 of the second device 28 directs the processor circuit 51 to request user and device private session keys in a similar manner (the discussion of the device private session key being omitted for ease of illustration). To request a user private session key, the processor circuit 51 of the second device is directed to transmit a signal 570 shown in FIG. 3, to the first "parent" server identified in the second device user-ID path field 544 shown in FIG. 7. In the illustrative example shown in FIG. 1, this first "parent" server is the key server 38. The contents of the signal 570 are identical to those of the signal 560 shown in FIG. 8. The signal 570 is transmitted in a secure manner to the key server 38, via a secure connection established using the key corresponding to the key server path information contained in the second device user-ID path field 544.

The first "parent" servers, in this example the key servers 36 and 38, proceed to forward the requests for a user private session key to the closest common user-ID key server, either directly, or via one or more intermediate key servers (if any) identified along the paths specified in the signals 560 and 570. To achieve this, the key server 36 includes the processor circuit 136, which is configured or programmed by a secure communications routine including a key server thread 74 similar to that shown in FIG. 2 in connection with the first device 26. The key server thread 74 configures the processor circuit 136 of the key server 36 to receive the request message (i.e., the signal 560) from the first device 26 requesting a private key, and to relay the request message to a common key server potentially accessible by both the first and second devices (in this case, the common key server 32). To achieve this, the key server thread 74 directs the processor circuit 136 to examine the contents of the first device field 562 of the signal 560, to determine whether the request message is intended for itself or for its own "parent" key server or a successive parent thereof. If the identification of the key server 36 is the last server identification in the first device field 562, then the signal 560 is intended for the key server 36; otherwise, if the identification of the key server 36 appears earlier in the sub-field (as in the present example), the processor circuit 136 is configured to relay the signal to the next successive parent key server identified in the first device field 562 of the signal 0.560.

Likewise, in this embodiment the key server 38 includes the processor circuit 138, which is similarly configured to relay the request message from the second device 28 to the common key server 32, in response to the second device field contents of the signal 570.

In this embodiment, the processor circuits 136 and 138 are configured or programmed to respond to such request messages as described herein. When the key server 36 receives the signal 560 from the first device 26, upon recognizing that the signal 560 is intended for its parent server or a successive parent thereof as described above, the processor circuit 136 is directed to place the connection with the first device 26 on "pause", and to transmit a signal 580 to the next successive key server identified in the first device field 562 of the signal 560. In the illustrative example shown in FIG. 1, the next successive key server is the closest common user-ID key server, which in this case is the common key server 32. The signal 580 is transmitted from the key server 36 to the common key server 32 in a secure manner, using a secure Internet connection between the key servers (more generally, in this specification, unless otherwise indicated, all communications among a device or key server and its "parent" key server are presumed to be via secure communications channels, as discussed above). The signal 580 includes the information contained in the signal 560.

Similarly, when the key server 38 receives the signal 570 from the second device 28, the processor circuit 138 is configured to place the secure connection with the second device on "pause", and to effectively relay the signal 570, by transmitting a signal 590 to the next successive key server identified in the second device field of the signal 570, which in this example is the common key server 32, over a secure communications connection therebetween.

Figure 10:
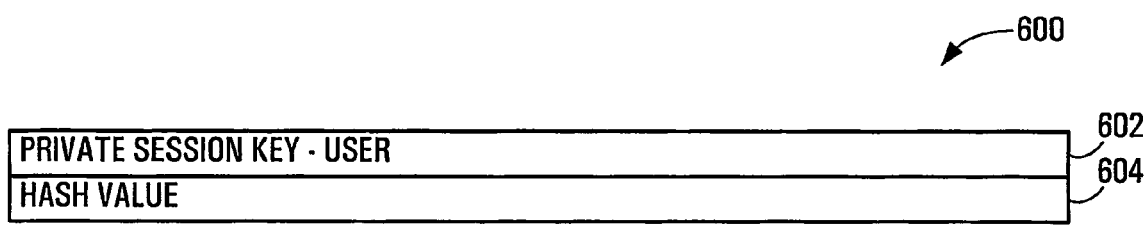
Figure 11:
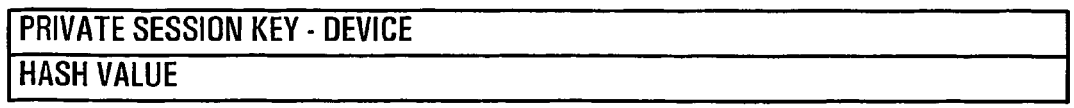

Referring to FIGS. 1, 3 and 10, the common key server 32 includes the processor circuit 132, which is configured or programmed by a secure communications routine including a key server thread 74 similar to that shown in FIG. 2 in connection with the first device 26. The key server thread 74 configures the processor circuit 132 to receive such request messages from first and second intermediate servers interposed between the common key server and the first and second devices respectively, requesting a private key. The processor circuit 132 is configured to generate and transmit the private key to the first and second intermediate servers in response to the request messages, for relay to the first and second devices. Thus, in the present embodiment, when the common key server 32 receives the signals 580 and 590, the processor circuit 132 of the common key server is configured to first determine whether the signals are intended for itself, or whether the signals are intended to be relayed to a next successive parent key server. If the identification of the common key server 32 appears last in the first device field of the signal 580 and in the second device field of the signal 590, the processor circuit is configured to recognize that the signals are intended for itself, and is configured to respond accordingly by generating a private key, which in this embodiment has a length of 8 kilobits. The processor circuit 132 is also directed to produce a hash value corresponding to the generated private key. In this embodiment the hash value is produced using the SHA1 hashing algorithm, although alternatively, other hashing algorithms may be substituted. The processor circuit 132 of the common key server 32 then transmits a signal 600 to the key server 36, and transmits an identical signal 610 to the key server 38, via the respective secure communications connections established above in connection with the signals 580 and 590. As shown in FIG. 10, the signal 600 includes a private session key field 602 and a hash value field 604, storing the generated user private session key and the hash value, respectively.

The processor circuit 136 of the intermediate key server 36 then receives the private key from the common key server and relays the private key for receipt by the one of the first and second devices. More particularly, when the key server 36 receives the signal 600, the processor circuit 136 is configured to resume the secure connection between itself and the processor circuit 50 of the first device 26 that was established in connection with the signal 560. The processor circuit 136 of the key server 36 securely transmits, to the first device 26, a signal 620 having contents identical to those of the private session key field 602 and the hash value field 604 of the signal 600.

In this embodiment, block 226 then configures the processor circuit 50 of the first device 26 to obtain the private key from one of the intermediate key servers that has received the private key from the common key server (in this case, from the intermediate key server 36). More particularly, in this embodiment block 226 directs the processor circuit 50 to receive the signal 620, and to store the received user private session key in a user private session key field of the private keys register 100 in the RAM 56. As the signal 600 transmitting the user private session key from the common key server 32 to the intermediate key server 36 was secure, as was the signal 620 relaying the key from the intermediate key server 36 to the first device, it will be appreciated that the processor circuit 50 is effectively configured to receive the private key from the common key server via a secure communications channel.

Block 228 then configures the processor circuit 50 to validate the private key relayed to it by the intermediate key server 36. More particularly, block 228 directs the processor circuit 50 to validate the private key by receiving a first hash value produced by the common key server in response to the private key, generating a second hash value in response to the received private key, and comparing the first and second hash values. More particularly still, block 228 directs the processor circuit 50 to receive and store the hash value received in the signal 620, which was generated by the common key server 32. Block 228 then directs the processor circuit 50 to generate a hash value in response to the contents of the user private session key field of the private keys register 100, using the same hashing algorithm as that used by the common key server 32 (in this embodiment, the SHA1 hashing algorithm). Block 228 further directs the processor circuit 50 to compare the generated hash value to the hash value received in the signal 620. Any difference between the generated and received hash values indicates that the private key has been corrupted in transit and should not be used.

Similarly, when the key server 38 receives the signal 610, it resumes the secure connection established between itself and the second device 28 that was established in connection with the signal 570. The key server 38 then transmits, to the second device, a signal 630 including the user private session key and the hash value. Blocks 226 and 228 of the instance of the messaging thread 66 that is concurrently executing on the second device 28 direct the processor circuit 51 to store the user private session key locally thereat, and to perform a hash value verification as discussed above in connection with the first device.

Thus, when the first device 26 and the second device 28 receive the signals 620 and 630 respectively, they now have a user private session key that may be used for secure communications between the first and second devices. Advantageously, in the present embodiment, the potentially exploitable security weaknesses associated with asymmetric encryption are avoided by utilizing symmetrical encryption for all secure communications methods during the establishment of a private symmetrical key.

Although the user private session key was transmitted from the common key server 32 to the first and second devices 26 and 28 using symmetrical encryption methods, in the present embodiment, additional security enhancements are provided to even further Minimize security risks.

Accordingly, to provide such enhancements in this embodiment, a plurality of keys are effectively blended together. In this regard, as noted the first and second devices 26 and 28 also request and obtain a device private session key from the closest common device-ID key server, in a manner analogous to that described above in connection with signals 560 through 630 in relation to the user private session key. The first device 26 stores the device private session key in a device private session key field of the private keys register 100, and the second device 28 also stores the obtained device private session key. In addition, it will be recalled that an initial session key was generated and is stored at each of the first and second devices, as discussed above in connection with the signal 540 and blocks 220 and 208.

Thus, in this embodiment, blocks 230 to 234 direct each of the processor circuits 50 and 51 to blend the first and second private keys (i.e., the user private session key and the device private session key) and the initial session key to produce a modified key. In this regard, block 230 directs the processor circuit 50 to encrypt at least one of the first and second private keys and the initial session key using at least one other of the first and second private keys and the initial session key. More particularly, block 230 directs the processor circuit 50 to encrypt the first private key using the second private key to produce a once-encrypted key. More particularly still, block 230 directs the processor circuit 50 to use the device private session key (stored in the device private session key field of the private keys register 100) to encrypt the user private session key (stored in the user private session key field of the private keys register 100), to produce a once-encrypted key.

In this embodiment, block 232 then directs the processor circuit 50 to encrypt the once-encrypted key using the initial session key (stored in the initial session key register 98) to produce a twice-encrypted key. The twice-encrypted key is stored in the blended key register 102.

Block 234 then directs the processor circuit 50 to generate a hash value in response to the twice-encrypted key, and append the hash value to the twice-encrypted key. More particularly, the processor circuit is directed to calculate a hash value of the twice-encrypted key, using the SHA1 hashing algorithm. The processor circuit is then directed to append the hash value to the end of the twice-encrypted key.

Block 234 further directs the processor circuit 50 to delete a portion of the twice-encrypted key other than the hash value appended thereto, the deleted portion having a length equal to the hash value appended thereto. More particularly, the processor circuit is directed to delete, from the beginning of the twice-encrypted key, a length equal to the length of the hash value it has just appended to the end of the key, thereby restoring the key to its original length.

Block 234 then directs the processor circuit 50 to repeat the steps of generating and appending a hash value to the twice-encrypted key and deleting a portion of the twice-encrypted key until the twice-encrypted key has been entirely replaced with appended hash values. More particularly, the processor circuit is directed to take the resulting modified key resulting from the above steps of appending and deleting, and to repeat the above hashing, appending and deleting steps, a plurality of times. In this embodiment, these steps are performed 52 times, at the end of which the entire original twice-encrypted key will have been completely deleted and replaced with appended hash values. The result, following such repetition of this hashing procedure, is a final, private session key, that may be used in establishing a secure communications connection between the first and second devices 26 and 28. Block 236 directs the processor circuit 50 to store this key in the final private session key register 104.

Similarly, blocks 230 through 236 of the concurrently executing messaging thread 66 on the second device 28 direct the processor circuit 51 to perform identical blending and hashing procedures, to generate and store a final private session key identical to that generated and stored in the final private session key register 104 of the first device 26.

Thus, the final private session key so generated is a truly private key, with no corresponding root keys stored in a software program or on the device or on a publicly accessible key server. As the final private session key has not been directly transmitted over the Internet at all, and no devices other than the first and second devices have all the data necessary to create the final private session key, security is considerably enhanced as compared to conventional secure communications systems. In addition, in the present example, the final private session key was obtained by first and second devices that did not share any immediate parent key server in common (i.e., there was no single server with which both the first and second devices had previously exchanged keys to enable secure communication therebetween). The common key server 32 was identified automatically by the processor circuits 50 and 51 under the direction of the messaging thread 66, without requiring the users of the first and second devices to have any advance knowledge of each other's key servers (or indeed, of their own key servers).

Once such a final private session key has been obtained by both the first and second devices 26 and 28 in the above manner, secure communications therebetween may be carried out. For example, the first device 26 may transmit a signal 650 to the second device 28, and the second device may transmit a signal 640 to the first device 26, both such signals being encrypted in response to the final private session key. If either such signal is received before the receiving device has finished producing the final private session key, the information encoded in the signal may be simply stored in a buffer until the required key has been produced.

In the present embodiment, such encrypted communications are handled by the various other threads of the secure communications routine 62, as discussed in greater detail below. Alternatively, however, numerous other ways of implementing secure communications between the first and second devices using the final private session key would be apparent to one of ordinary skill in the art upon reviewing this specification. In general, any suitable encryption method may be employed.

However, a particularly advantageous encryption method, employing a modified ARC4 streaming cipher encryption method with session control, is briefly described for illustrative purposes.

ENCRYPTION\DECRYPTION THREAD

Referring back to FIG. 2, in the present embodiment, the encryption/decryption thread 68 co-operates with the various other threads (described briefly below) of the secure communications routine 62 to configure the processor circuits 50 and 51 to encrypt communications between the first and second devices in response to the private key. More particularly, each processor circuit is configured to encrypt communications using a blended key produced in response to the private key. More particularly still, such encryption occurs using the final private session key produced in response to the first and second private keys and the initial session key (stored in the final private session key register 104). For ease of illustration, only the processor circuit 50 of the first device 26 is described, it being understood that the processor circuit 51 of the second device 28 is similarly configured.

In this embodiment, the encryption/decryption thread 68 configures the processor circuit 50 to initiate a cipher communications session using the blended key described above. More particularly, the processor circuit is configured to use the final private session key stored in the final private session key register 104, to initiate and execute a modified ARC4 streaming cipher communications session, the communications stream including session control information, key server information, and user data.

In this embodiment, the encryption/decryption thread 68 directs the processor circuit 50 to determine whether outgoing data has been placed in either the send buffer 110 or the key send buffer 112 for encryption and transmission to the second device. If so, the processor circuit is directed to encrypt up to one 64 kB block of data in accordance with the modified ARC4 algorithm described below, and to append a header to the encrypted block, the header including the length of the block, a data verification value produced in response to the length, and a flag indicative of whether the block represents user data from the send buffer 110 or key data from the key send buffer 112. Similarly, the encryption/decryption thread 68 directs the processor circuit to decrypt received data that has been placed in the pipe receive global buffer 118 under the direction of the pipe control/TCP send thread 70, by decrypting such data according to the modified ARC4 algorithm described below, and storing the decrypted data in either the receive buffer 122 or the key receive buffer 120, depending on whether the header flag indicates user data or key data, respectively.

In the present embodiment, the encryption/decryption thread 68 includes a number of modifications to the conventional ARC4 method. It will be appreciated that the conventional ARC4 method involves use of an array produced in response to the relevant key, referred to as an S-array, to encrypt communications. The conventional ARC4 method is designed to use 2 kilobit keys, whereas the present embodiment of the invention employs 8 kilobit or 1 kiloByte keys. Accordingly, in this embodiment the ARC4 algorithm is modified to accommodate the larger key size of the final private session key, and the corresponding larger size of the S-array. For example, in the initialization and definition of the S-array, and the temporary K-array used to assist in this initialization and definition process, the modulus or remainder operator is changed from MOD 256 to MOD 1024. Similarly, many of the For-Next loop indices are ranged from 0 to 1023 rather than 0 to 255. Further necessary modifications in this regard will be readily apparent to one of ordinary skill in the art upon review of the instructions disclosed herein.

In addition, in the present embodiment, during the initial definition of the S-array, the conventional ARC4 algorithm includes a swapping or shuffling loop, whereby each entry in the S-array is swapped with one other entry in the S-array. The conventional ARC4 algorithm executes this swapping loop once. However, in the present embodiment, in which a larger S-array is employed, the processor circuit 50 is configured to repeat the shuffling loop of the ARC4 streaming cipher communications session, a prime number of times greater than two. For example, in this embodiment the shuffling or swapping loop is repeated 13 times, to reduce the statistical likelihood that the repeated swapping may tend to restore the array to a configuration closer to its original configuration.

In this embodiment, both the first and second devices are configured or programmed to generate the S-array in the same way. Accordingly, as they will both begin with an identical final private session key, they will both arrive at the same initial S-array, with which to commence encrypted communications.

Once the S-array has been initialized and generated in this manner, it may then be used by the "inner loop" of the ARC4 algorithm to encrypt communications between the first and second devices. It will be appreciated that the ARC4 streaming cipher effectively modifies the encryption key each time a new character is encrypted. In this embodiment, the inner loop of the ARC4 algorithm is re-written in assembler language, for faster processing. In this embodiment, the modified inner loop of the ARC4 algorithm includes four main steps for encrypting each successive character. First, a looping counter i ranging from 0 to 1023 is incremented (resetting to 0 after 1023). Second, a random location of the S-array is selected, by setting a value $j_{current}=[j_{previous}+S(i)]MOD1024$. Third, the contents of two locations of the S-array, namely, S(i) and S(j), are swapped. Fourth, a mixing value is selected, by taking a value [S(i)+S(j)]MOD1024, using this value as an array location index to look up a value stored in the S-array, or in other words, S([S(i)+(j)]MOD1024), taking the modulus or remainder operator 256 of this value, or in other words, S([S(i)+S(j)]MOD1024)MOD256, and performing an exclusive OR operation on the current character and this latter value, to yield (encrypted character)=(current character) XOR[S([S(i)+S(j)]MOD1024)MOD256]. It will be appreciated that this latter step is a further modification of the conventional ARC4 algorithm, which performs the XOR operation using [S([S(i)+S(j)]MOD256)] rather than [S([S(i)+S(j)]MOD1024)MOD256].

Additionally, in this embodiment, the values used by the inner loop of the modified ARC4 algorithm, including the entire S-array and the counter indices i and j, are saved following encryption of each block of data, so that when the next block of data is to be encrypted in the same session, the previously saved S-array and counter values are used. Therefore, in this embodiment, the S-array does not have to be re-initialized following encryption of each block of data. Rather, the encryption proceeds continuously throughout the entire communications session between the first and second devices. Effectively, the entire communications session, which may involve transmission of a large number of data blocks (which in this embodiment are 64 kB blocks), is treated as if it were a single block for the purpose of the changing encryption key value, as the encryption key is never re-initialized during the session.

As noted, the data stream encrypted using the modified ARC4 algorithm as described above includes session control information, key server information, and user data. In this embodiment, the session control value is a calculated value that changes according to pre-defined rules over successive time periods. For example, the session control value may be changed every 5 seconds, and may be changed according to a seeded pseudo-random number generation scheme, or any suitable alternative method. When the session is first established, one of the first and second devices transmits an initial session control value to the other device. Each of the first and second devices calculates a next expected session control value, that it expects to receive from the other device during the next successive time period. Periodically (e.g., once per time period), each device checks the session control value presently received from the other device, and if the received session control value is not equal to the expected session control value, the device terminates the communications session with the other device.

In this embodiment, a data verification value is produced for each data block and is appended to the data block before the data block is encrypted. In this embodiment, each data block has a size of 64 kB. In this regard, although conventional methods such as the SHA1 hashing algorithm could conceivably be used to produce hash values to act as data verification values for the various data blocks, the SHA1 algorithm tends to entail an undesirably large amount of overhead for use on every data block to be transmitted and received. In addition, the level of security required for the data verification value is lessened in the present embodiment, due to the fact that the data verification value is encrypted along with the data block. Accordingly, in this embodiment an alternative data verification value is produced, as follows. To produce the data verification value for a data string having a length L, the data verification value, which has 4 bytes, is initially set to zero. Then, for each character in the data string, a specific successive byte of the data verification value is modified: the first byte is modified for the first, fifth, ninth, etc. characters of the data string, the second byte is modified for the second, sixth, tenth, etc. characters. For illustrative notational purposes, if the four bytes are labelled byte#0, byte#1, byte#2 and byte#3, and the character location of each character in the data string is denoted by x ($0 \leq x \leq (L-1)$), then for the $x^{th}$ character, byte#(xMOD4) is modified. The identified byte of the data verification value is first subjected to an XOR operation with the $((L-1)-x)^{th}$ character of the data string (for example, for the first character at location x=0, byte#0 of the data verification value is XOR'd with the last or $(L-1)^{th}$ character of the data string.) The resulting value is then subjected to an XOR operation with xMOD256. This is repeated for each of the L values of the data string, to arrive at the final data verification value for the data string.

OTHER THREADS

It will be recalled that in the present embodiment, the user applications 64 do not interface directly with the TCP/IP functionality of the operating system 60. Rather, the user applications 64 interface with the secure communications routine 62, which is provided in the form of a dynamic link library (.dll) file, and which establishes and handles all TCP/IP communications.

Generally, the TCP receive thread 72 directs the processor circuit 50 to continuously poll an operating system TCP receive buffer and append blocks of any received data to the pipeline control buffer 116, checking for TCP errors and appending errors.

In this embodiment, the pipe control/TCP send thread 70 generally directs the processor circuit 50 to both transmit and assist in receiving data. For example, the pipe control/TCP send thread directs the processor circuit to check whether any outgoing data has been placed in the global pipe send buffer 114. If so, the processor circuit is directed to remove up to one 64 kB block of such data, to append a header to the block (in this embodiment the header includes a length of the block, a data verification value produced in response to the length, and a data flag indicating whether the block represents session control information or user data), to store the block in a local send buffer (not shown), and to invoke an operating system TCP send function to transmit the block to the second device. The pipe control/TCP send thread 70 also directs the processor circuit 50 to periodically calculate a new session control value (as discussed above in connection with the encryption/decryption thread 68), for each new successive time period of the session, and to transmit the session control value to the second device in a similar manner. The pipe control/TCP send thread 70 also assists in receiving data, by directing the processor circuit to determine whether data has been placed in the pipeline control buffer 116 under the direction of the TCP receive thread 72, and if so, to parse the received data into data blocks. If the received data is session control information, the processor circuit is directed to compare the received session control value to the expected value, and to terminate the session with the second device if they are not equal, as discussed above. If the received data is user data (as indicated by a flag in the header), the processor circuit is directed to store the received data blocks in the pipe receive global buffer 118. The pipe control/TCP send thread 70 also directs the processor circuit to terminate the session with the second device if no session control value has been received in a time period exceeding a threshold timeout value.

In the present embodiment, the data object monitor thread 76 configures the processor circuit 50 to provide cross-object statistical information, including global error notification, within the secure communications layer, the applications layer, and optionally to the end user if the communications layer is running in debug mode. Also in this embodiment, the data object monitor thread configures the processor circuit to clear deadlocks that could potentially occur in the global memory registers, clean up locks on global memory registers that may have timed out, and perform memory management operations (e.g. garbage collection) when an object is destroyed.

In this embodiment, the key server thread 74 is included in the secure communications routine 62, to allow the processor circuit 50 to function as a key server, including performing the functions of the intermediate key server 36 and the common key server 32 as described earlier herein, for example. In this embodiment, the messaging thread 66 cooperates with the key server thread 74 to configure the processor circuit 50 to process key management tasks for both client operations and server operations. In turn, the key server thread 74 cooperates with the messaging thread 66 and its associated threads to configure the processor circuit to perform the actual sending and receiving of the data (it will be recalled that in the present embodiment, the pipe control/TCP thread identifies transmitted data as user data (application data,) control data (pipe control data), or the key data (key server thread data). The cooperation of the threads to achieve such functionality tends to significantly reduce the size of the secure communications routine 62 and its complexity as duplication of programming logic is avoided.

In the present embodiment, the threadsafe function 80 includes sub-functions that allow the processor circuit 50, under the direction of a particular thread, to lock or unlock the contents of a data field, to copy the contents of a data field, to remove or cut the contents of a data field, to put data into a field replacing its former contents, to remove only a single block of data from a field on a first-in-first-out basis, to append data to a buffer, to initialize a buffer size, and other similar data management functions. The threadsafe function 80 cooperates with the data object monitor thread 76 discussed above to achieve such functionality.

Alternatively, however, other suitable delineations of functionality among the various threads may be substituted. More generally, any other suitable way of causing a processor circuit or equivalent device to perform the functions herein may be substituted without departing from the scope of the present invention.

More generally still, while specific embodiments of the invention have been described and illustrated, such embodiments should be considered illustrative of the invention only and not as limiting the invention as construed in accordance with the accompanying claims.

What is claimed is:

1. A method of facilitating secure communication between first and second devices, the method comprising:
    automatically identifying a common key server potentially accessible by both the first and second devices, wherein identifying comprises transmitting identifications of key servers from one of the first and second devices to the other of the first and second devices; and
    obtaining a secure private key from the common key server, for use in encrypting communications between the first and second devices.

2. The method of claim 1 wherein identifying further comprises producing a first list of key servers potentially accessible by the first device.

3. The method of claim 2 wherein producing comprises including in the first list, identifications of key servers associated with first device keys stored in a storage medium of the first device.

4. The method of claim 3 wherein producing further comprises including in the first list, identifications of intermediate key servers interposed along secure communications paths between each of the key servers associated with the first device keys and a master key server.

5. The method of claim 2 wherein transmitting comprises transmitting the first list from the first device to the second device.

6. The method of claim 5 wherein identifying further comprises receiving at the first device, from the second device, an identification of the common key server.

7. The method of claim 1 wherein identifying further comprises receiving at the second device, a first list of key servers potentially accessible by the first device.

8. The method of claim 7 wherein identifying further comprises producing a second list of key servers potentially accessible by the second device.

9. The method of claim 8 wherein producing comprises including in the second list, identifications of key servers associated with second device keys stored in a storage medium of the second device.

10. The method of claim 9 wherein producing further comprises including in the second list, identifications of intermediate key servers interposed along secure communications paths between each of the key servers associated with the second device keys and a master key server.

11. The method of claim 8 wherein identifying further comprises comparing the first and second lists, and identifying, as the common key server, a key server identified in both lists.

12. The method of claim 11 wherein identifying comprises identifying as the common key server, from among a group of key servers each of which is identified in both the first and second lists, the key server having the shortest communications paths to the first and second devices.

13. The method of claim 11 wherein transmitting comprises transmitting, from the second device to the first device, an identification of the common key server.

14. The method of claim 13 wherein transmitting further comprises transmitting, from the second device to the first device, identifications of any intermediate key servers interposed between the first device and the common key server.

15. The method of claim 1 wherein identifying comprises identifying as the common key server, a key server at an intersection of a first communication path defined between a first key server having a previously established relationship with the first device and a master key server, and a second communication path defined between a second key server having a previously established relationship with the second device and the master key server.

16. The method of claim 1 wherein identifying further comprises identifying intermediate key servers interposed along a communications path between one of the first and second devices and the common key server.

17. The method of claim 16 wherein obtaining comprises obtaining the private key from one of the intermediate key servers that has received the private key from the common key server.

18. The method of claim 1 wherein obtaining comprises receiving the private key from the common key server via a secure communications channel.

19. The method of claim 18 wherein receiving comprises receiving the private key from an intermediate key server that has received the private key from the common key server.

20. The method of claim 18 wherein obtaining further comprises transmitting a request message to the common key server to request the common key server to transmit the private key.

21. The method of claim 20 wherein transmitting comprises transmitting the request message to an intermediate key server, for relay to the common key server.

22. The method of claim 18 further comprising validating the private key.

23. The method of claim 22 wherein validating comprises receiving a first hash value produced by the common key server in response to the private key, generating a second hash value in response to the received private key, and comparing the first and second hash values.

24. The method of claim 1 wherein obtaining comprises obtaining first and second private keys from at least one of the common key server and a second common key server potentially accessible by both the first and second devices.

25. The method of claim 24 wherein obtaining first and second private keys comprises obtaining a private user key from a common user key server and a private device key from a common device key server.

26. The method of claim 24 further comprising obtaining an initial session key.

27. The method of claim 26 wherein obtaining the initial session key comprises receiving the initial session key at the first device.

28. The method of claim 26 wherein obtaining the initial session key comprises generating the initial session key at the second device and transmitting the initial session key to the first device.

29. The method of claim 26 further comprising encrypting communications between the first and second devices, in response to the first and second private keys and the initial session key.

30. The method of claim 26 wherein encrypting comprises blending the first and second private keys and the initial session key to produce a modified key.

31. The method of claim 30 wherein blending comprises encrypting at least one of the first and second private keys and the initial session key using at least one other of the first and second private keys and the initial session key.

32. The method of claim 30 wherein blending comprises encrypting the first private key using the second private key to produce a once-encrypted key.

33. The method of claim 32 wherein blending further comprises encrypting the once-encrypted key using the initial session key to produce a twice-encrypted key.

34. The method of claim 33 wherein blending further comprises generating a hash value in response to the twice-encrypted key, and appending the hash value to the twice-encrypted key.

35. The method of claim 34 wherein blending further comprises deleting a portion of the twice-encrypted key other than the hash value appended thereto, the deleted portion having a length equal to the hash value appended thereto.

36. The method of claim 35 wherein blending further comprises repeating the steps of generating and appending a hash value to the twice-encrypted key and deleting a portion of the twice-encrypted key until the twice-encrypted key has been entirely replaced with appended hash values.

37. The method of claim 24 further comprising encrypting communications between the first and second devices, in response to the first and second private keys.

38. The method of claim 1 further comprising encrypting communications between the first and second devices, in response to the private key.

39. The method of claim 38 wherein encrypting comprises encrypting communications between the first and second devices using a blended key produced in response to the private key.

40. The method of claim 39 wherein encrypting comprises initiating a cipher communications session with the blended key.

41. The method of claim 40 wherein initiating comprises executing a modified ARC4 streaming cipher communications session.

42. The method of claim 41 wherein executing comprises repeating a shuffling loop of the ARC4 streaming cipher communications session, a prime number of times greater than two.

43. A computer-readable medium storing code segments for directing a processor circuit to;
automatically identify a common key server potentially accessible by both first and second devices, comprising transmitting identifications of key servers from one of the first and second devices to the other of the first and second devices; and
obtain a secure private key from the common key server, for use in encrypting communications between the first and second devices.

44. An apparatus for facilitating secure communication between first and second devices, the apparatus comprising:
a processor circuit capable of communication with a network, the processor circuit configured to identify a common key server potentially accessible by both the first and second devices, wherein the processor circuit is configured to transmit identifications of key servers from one of the first and second devices to the other of the first and second devices;
wherein the processor circuit is configured to obtain a secure private key from the common key server, for use in encrypting communications between the first and second devices.

45. The apparatus of claim 44 wherein the processor circuit is configured to produce a first list of key servers potentially accessible by the first device.

46. The apparatus of claim 45 wherein the processor circuit is configured to include in the first list, identifications of key servers associated with first device keys stored in a storage medium of the first device.

47. The apparatus of claim 46 wherein the processor circuit is configured to include in the first list, identifications of intermediate key servers interposed along secure communications paths between each of the key servers associated with the first device keys and a master key server.

48. The apparatus of claim 45 wherein the processor circuit is configured to transmit the first list from the first device to the second device.

49. The apparatus of claim 48 wherein the processor circuit is configured to receive at the first device, from the second device, an identification of the common key server.

50. The apparatus of claim 44 wherein the processor circuit is configured to receive at the second device, a first list of key servers potentially accessible by the first device.

51. The apparatus of claim 50 wherein the processor circuit is configured to produce a second list of key servers potentially accessible by the second device.

52. The apparatus of claim 51 wherein the processor circuit is configured to include in the second list, identifications of key servers associated with second device keys stored in a storage medium of the second device.

53. The apparatus of claim 52 wherein the processor circuit is configured to include in the second list, identifications of intermediate key servers interposed along secure communications paths between each of the key servers associated with the second device keys and a master key server.

54. The apparatus of claim 51 wherein the processor circuit is configured to compare the first and second lists, and identify, as the common key server, a key server identified in both lists.

55. The apparatus of claim 54 wherein the processor circuit is configured to identify as the common key server, from among a group of key servers each of which is identified in both the first and second lists, the key server having the shortest communications paths to the first and second devices.

56. The apparatus of claim 54 wherein the processor circuit is configured to transmit, from the second device to the first device, an identification of the common key server.

57. The apparatus of claim 56 wherein the processor circuit is configured to transmit, from the second device to the first device, identifications of any intermediate key servers interposed between the first device and the common key server.

58. The apparatus of claim 44 wherein the processor circuit is configured to identify as the common key server, a key server at an intersection of a first communication path defined between a first key server having a previously established relationship with the first device and a master key server, and a second communication path defined between a second key server having a previously established relationship with the second device and the master key server.

59. The apparatus of claim 44 wherein the processor circuit is configured to identify intermediate key servers interposed along a communications path between one of the first and second devices and the common key server.

60. The apparatus of claim 59 wherein the processor circuit is configured to obtain the private key from one of the intermediate key servers that has received the private key from the common key server.

61. The apparatus of claim 44 wherein the processor circuit is configured to receive the private key from the common key server via a secure communications channel.

62. The apparatus of claim 61 wherein the processor circuit is configured to receive the private key from an intermediate key server that has received the private key from the common key server.

63. The apparatus of claim 61 wherein the processor circuit is configured to transmit a request message to the common key server to request the common key server to transmit the private key.

64. The apparatus of claim 63 wherein the processor circuit is configured to transmit the request message to an intermediate key server, for relay to the common key server.

65. The apparatus of claim 61 the processor circuit is configured to validate the private key.

66. The apparatus of claim 65 wherein the processor circuit is configured to validate the private key by receiving a first hash value produced by the common key server in response to the private key, generating a second hash value in response to the received private key, and comparing the first and second hash values.

67. The apparatus of claim 44 wherein the processor circuit is configured to obtain first and second private keys from at least one of the common key server and a second common key server potentially accessible by both the first and second devices.

68. The apparatus of claim 67 wherein the processor circuit is configured to obtain, as the first and second private keys, a private user key from a common user key server and a private device key from a common device key server.

69. The apparatus of claim 67 wherein the processor circuit is configured to obtain an initial session key.

70. The apparatus of claim 69 wherein the processor circuit is configured to receive the initial session key at the first device.

71. The apparatus of claim 69 wherein the processor circuit is configured to generate the initial session key at the second device and transmit the initial session key to the first device.

72. The apparatus of claim 69 wherein the processor circuit is configured to encrypt communications between the first and second devices, in response to the first and second private keys and the initial session key.

73. The apparatus of claim 72 wherein the processor circuit is configured to blend the first and second private keys and the initial session key to produce a modified key.

74. The apparatus of claim 73 wherein the processor circuit is configured to encrypt at least one of the first and second private keys and the initial session key using at least one other of the first and second private keys and the initial session key.

75. The apparatus of claim 73 wherein the processor circuit is configured to encrypt the first private key using the second private key to produce a once-encrypted key.

76. The apparatus of claim 75 wherein the processor circuit is configured to encrypt the once-encrypted key using the initial session key to produce a twice-encrypted key.

77. The apparatus of claim 76 wherein the processor circuit is configured to generate a hash value in response to the twice-encrypted key, and append the hash value to the twice-encrypted key.

78. The apparatus of claim 77 wherein the processor circuit is configured to delete a portion of the twice-encrypted key other than the hash value appended thereto, the deleted portion having a length equal to the hash value appended thereto.

79. The apparatus of claim 78 wherein the processor circuit is configured to repeat the steps of generating and appending a hash value to the twice-encrypted key and deleting a portion of the twice-encrypted key until the twice-encrypted key has been entirely replaced with appended hash values.

80. The apparatus of claim 67 wherein the processor circuit is configured to encrypt communications between the first and second devices, in response to the first and second private keys.

81. The apparatus of claim 44 wherein the processor circuit is configured to encrypt communications between the first and second devices, in response to the private key.

82. The apparatus of claim 81 wherein the processor circuit is configured to encrypt communications between the first and second devices using a blended key produced in response to the private key.

83. The apparatus of claim 82 wherein the processor circuit is configured to initiate a cipher communications session with the blended key.

84. The apparatus of claim 83 wherein the processor circuit is configured to execute a modified ARC4 streaming cipher communications session.

85. The apparatus of claim 84 wherein the processor circuit is configured to repeat a shuffling loop of the ARC4 streaming cipher communications session, a prime number of times greater than two.

86. An apparatus for facilitating secure communication between first and second devices, the apparatus comprising:
   means for identifying a common key server potentially accessible by both the first and second devices, wherein the means for identifying comprises means for transmitting identifications of key servers from one of the first and second devices to the other of the first and second devices; and
   means for obtaining a secure private key from the common key server, for use in encrypting communications between the first and second devices.

87. A method of facilitating secure communications between first and second devices, the method comprising:
   receiving, at an intermediate key server, a request message from one of the first and second devices requesting a private key;
   relaying the request message to a common key server potentially accessible by both the first and second devices;
   receiving the private key from the common key server at the intermediate key server; and
   relaying the private key for receipt by the one of the first and second devices via a secure communications channel.

88. A computer-readable medium storing code segments for directing a processor circuit to:
   receive, at an intermediate key server, a request message from one of a first device and a second device requesting a private key;
   relay the request message to a common key server potentially accessible by both the first and second devices;
   receive the private key from the common key server at the intermediate key server; and
   relay the private key for receipt by the one of the first and second devices via a secure communications channel.

89. An apparatus for facilitating secure communications between first and second devices, the apparatus comprising:

an intermediate key server comprising a processor circuit configured to receive a request message from one of the first and second devices requesting a private key;

wherein the processor circuit is configured to:
- relay the request message to a common key server potentially accessible by both the first and second devices;
- receive the private key from the common key server; and
- relay the private key for receipt by the one of the first and second devices via a secure communications channel.

90. An apparatus for facilitating secure communications between first and second devices, the apparatus comprising:
an intermediate key server comprising:
- means for receiving a request message from one of the first and second devices requesting a private key;
- means for relaying the request message to a common key server potentially accessible by both the first and second devices;
- means for receiving the private key from the common key server; and
- means for relaying the private key for receipt by the one of the first and second devices via a secure communications channel.

91. A method of facilitating secure communications between first and second devices, the method comprising:
- receiving, at a common key server potentially accessible by both the first and second devices, request messages from first and second intermediate servers interposed between the common key server and the first and second devices respectively, requesting a private key; and
- generating and transmitting the private key to the first and second intermediate servers in response to the request messages, for relay to the first and second devices via a secure communications channel.

92. A computer-readable medium storing code segments for directing a processor circuit to:
- receive, at a common key server potentially accessible by both first and second devices, request messages from first and second intermediate servers interposed between the common key server and the first and second devices respectively, requesting a private key; and
- generate and transmit the private key to the first and second intermediate servers in response to the request messages, for relay to the first and second devices via a secure communications channel.

93. An apparatus for facilitating secure communications between first and second devices, the apparatus comprising:
a common key server potentially accessible by both the first and second devices, the common key server comprising a processor circuit configured to receive request messages from first and second intermediate servers interposed between the common key server and the first and second devices respectively, requesting a private key;
wherein the processor circuit is configured to generate and transmit the private key to the first and second intermediate servers in response to the request messages, for relay to the first and second devices via a secure communications channel.

94. An apparatus for facilitating secure communications between first and second devices, the apparatus comprising:
a common key server potentially accessible by both the first and second devices, the common key server comprising:
- means for receiving request messages from first and second intermediate servers interposed between the common key server and the first and second devices respectively, requesting a private key; and
- means for generating and transmitting the private key to the first and second intermediate servers in response to the request messages, for relay to the first and second devices via a secure communications channel.

* * * * *